(12) United States Patent
Nakamura

(10) Patent No.: US 9,151,192 B2
(45) Date of Patent: Oct. 6, 2015

(54) VARIABLE VALVE SYSTEM, CONTROL APPARATUS AND VARIABLE VALVE APPARATUS FOR INTERNAL COMBUSTION ENGINE

(71) Applicant: HITACHI AUTOMOTIVE SYSTEMS, LTD., Hitachinaka-shi, Ibaraki (JP)

(72) Inventor: Makoto Nakamura, Zushi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/199,236

(22) Filed: Mar. 6, 2014

(65) Prior Publication Data

US 2014/0251243 A1 Sep. 11, 2014

(30) Foreign Application Priority Data

Mar. 7, 2013 (JP) ................................. 2013-044864

(51) Int. Cl.
| | |
|---|---|
| *F01L 1/34* | (2006.01) |
| *F01L 13/00* | (2006.01) |
| *F02D 13/02* | (2006.01) |
| *B60K 6/485* | (2007.10) |
| *F01L 1/10* | (2006.01) |
| *F01L 1/18* | (2006.01) |

(52) U.S. Cl.
CPC ............ *F01L 13/0015* (2013.01); *B60K 6/485* (2013.01); *F01L 13/0005* (2013.01); *F01L 13/0063* (2013.01); *F02D 13/0203* (2013.01); *F01L 1/10* (2013.01); *F01L 1/185* (2013.01); *Y02T 10/18* (2013.01); *Y02T 10/6226* (2013.01)

(58) Field of Classification Search
CPC ... F01L 13/0015; F01L 13/00; F01L 12/0015; F01L 1/10; F01L 1/185; F01L 13/0005; F01L 13/0063; F02D 13/0203; B60K 6/485; Y02T 10/6226; Y02T 10/18
USPC ............................................ 123/90.15, 90.16
See application file for complete search history.

(56) References Cited

U.S. PATENT DOCUMENTS

| | | | | | |
|---|---|---|---|---|---|
| 4,531,617 | A | * | 7/1985 | Martin et al. | .................. 187/373 |
| 6,321,704 | B1 | * | 11/2001 | Church et al. | ............. 123/90.16 |
| 7,942,123 | B2 | * | 5/2011 | Hara et al. | .................. 123/90.39 |
| 2008/0245326 | A1 | | 10/2008 | Gemein | |
| 2011/0180027 | A1 | | 7/2011 | Hartlieb et al. | |

FOREIGN PATENT DOCUMENTS

JP 2007-100585 A 4/2007

* cited by examiner

*Primary Examiner* — Zelalem Eshete
(74) *Attorney, Agent, or Firm* — Foley & Lardner LLP

(57) ABSTRACT

A variable valve system for an internal combustion engine includes a plurality of engine valves provided per one cylinder; a swing arm configured to perform an opening-and-closing operation of at least one of the plurality of engine valves by swinging about a fulcrum given by a support member; a variable lift mechanism configured to cause the swing arm to swing, and to vary a lift amount of the at least one of the plurality of engine valves; a valve stop mechanism provided for the at least one of the plurality of engine valves and configured to stop the opening-and-closing operation of the at least one of the plurality of engine valves by producing a lost motion of the support member; and an engine-speed limiting section configured to variably limit a maximum rotational speed of the internal combustion engine in accordance with a displacement amount of the lost motion.

5 Claims, 17 Drawing Sheets

VARIABLE VALVE SYSTEM, CONTROL APPARATUS AND VARIABLE VALVE APPARATUS FOR INTERNAL COMBUSTION ENGINE

BACKGROUND OF THE INVENTION

The present invention relates to a variable valve system and the like for an internal combustion engine, in which an engine valve can be stopped according to an operating state of the internal combustion engine.

Japanese Patent Application Publication No. 2007-100585 discloses a previously-proposed variable valve system for an internal combustion engine. In this technique, a lash adjuster switches between an opening-and-closing operation of an engine valve and a stop of the opening-and-closing operation. The lash adjuster includes a tubular body portion, a plunger portion and a switching mechanism portion. Whole of the tubular body portion is accommodated in a case fixed to a cylinder head, and is upwardly biased by a spring. The tubular body portion is slidable inside the case in an up-down direction. The plunger portion is provided inside the tubular body portion to be slidable in the up-down direction relative to the tubular body portion. An upper end side of the plunger portion supports one end portion of a rocker arm. The switching mechanism portion switches between the operating state and the operation-stopped state of the engine valve which is opened and closed by a swing motion of the rocker arm.

A connecting pin of the switching mechanism portion moves in communication holes of the tubular body portion and the case by means of oil pressure. Accordingly, the tubular body portion (lash adjuster) is locked to an engine main body such that the engine valve is brought into the operating state, or is made to do a lost motion such that the engine value is brought into the operation-stopped state. This switching is performed in order to improve fuel economy and output of the engine.

SUMMARY OF THE INVENTION

However, in the above previously-proposed variable valve system, a displacement amount of the lost motion of the tubular body portion (lash adjuster) is enlarged if a lift amount of a drive cam is set to be relatively large in order to enhance output power of the engine. Thereby, an open angle between the rocker arm and a longitudinal direction of the lash adjuster is enlarged. In a contact portion between a tip head portion of the plunger portion of the lash adjuster and a concave portion formed in the one end portion of the rocker arm, there is a risk that a lateral deviation therebetween is caused to harmfully affect a smooth lost-motion operation.

Moreover, in a case that engine speed has risen up to a high-speed region, a floating state (non-contact state) between the tip head portion of the plunger portion and the concave portion of the one end portion of the rocker arm is caused, so that the lateral deviation of the concave portion of the one end portion of the rocker arm increases relative to the tip head portion of the plunger portion. This makes it easier for a partial wear to occur between the concave portion of the one end portion of the rocker arm and the tip head portion of the plunger portion. According to circumstances, there is a risk that the concave portion of the one end portion of the rocker arm is detached (removed) from the tip head portion of the plunger portion.

It is therefore an object of the present invention to provide a system or apparatus for an internal combustion engine, devised to suppress an irregular behavior such as the partial wear and the detachment by limiting a maximum rotational speed of the engine.

According to one aspect of the present invention, there is provided a variable valve system for an internal combustion engine, comprising: a plurality of engine valves provided per one cylinder; a swing arm configured to perform an opening-and-closing operation of at least one of the plurality of engine valves by swinging about a fulcrum given by a support member; a variable lift mechanism configured to cause the swing arm to swing, and to vary a lift amount of the at least one of the plurality of engine valves; a valve stop mechanism provided for the at least one of the plurality of engine valves, and configured to stop the opening-and-closing operation of the at least one of the plurality of engine valves by producing a lost motion of the support member; and an engine-speed limiting section configured to variably limit a maximum rotational speed of the internal combustion engine in accordance with a displacement amount of the lost motion produced by the valve stop mechanism.

According to another aspect of the present invention, there is provided a control apparatus for an internal combustion engine, comprising: a plurality of engine valves provided per one cylinder; a swing arm configured to perform an opening-and-closing operation of at least one of the plurality of engine valves by swinging about a fulcrum given by a support member; a variable lift mechanism configured to cause the swing arm to swing, and to vary a lift amount of the at least one of the plurality of engine valves; a valve stop mechanism provided for the at least one of the plurality of engine valves, and configured to stop the opening-and-closing operation of the at least one of the plurality of engine valves by producing a lost motion of the support member; and an electronic controller configured to controllably limit a maximum rotational speed of the internal combustion engine in accordance with a displacement amount of the lost motion produced by the valve stop mechanism.

According to still another aspect of the present invention, there is provided a variable valve apparatus for an internal combustion engine, comprising: a plurality of engine valves provided per one cylinder; a swing arm configured to perform an opening-and-closing operation of at least one of the plurality of engine valves by swinging about a fulcrum given by a support member; a variable lift mechanism configured to cause the swing arm to swing, and to vary a lift amount of the at least one of the plurality of engine valves; a valve stop mechanism provided for the at least one of the plurality of engine valves, and configured to stop the opening-and-closing operation of the at least one of the plurality of engine valves by producing a lost motion of the support member; and an engine-speed limiting section configured to variably limit a maximum rotational speed of the internal combustion engine in accordance with a displacement amount of the lost motion produced by the valve stop mechanism, wherein the engine-speed limiting section includes a detecting section configured to detect a current value of the displacement amount of the lost motion and to output an information signal of the current value.

The other objects and features of this invention will become understood from the following description with reference to the accompanying drawings.

DETAILED DESCRIPTION OF THE INVENTION

Figure 1:
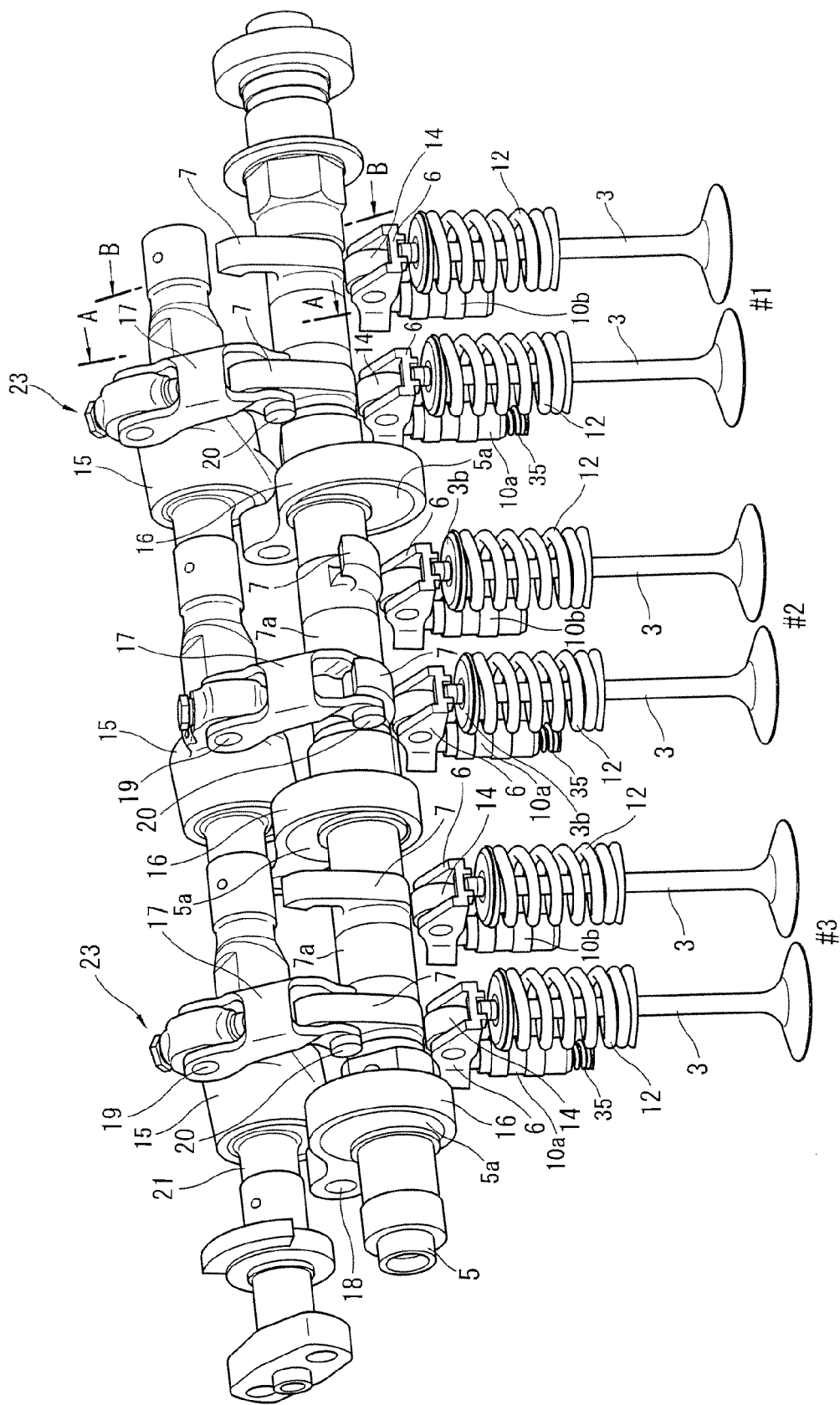
FIG. 1 is an oblique perspective view showing a first embodiment in which a valve apparatus according to the present invention is applied to an in-line three-cylinder internal combustion engine.

Hereinafter, embodiments of variable valve system, control apparatus and variable valve apparatus for an internal combustion engine according to the present invention will be explained referring to the drawings. The variable valve system, the control apparatus or the variable valve apparatus in the following embodiments is applied to an in-line three-cylinder engine (or, applied to one bank of a V-six-cylinder engine), and includes a variable lift mechanism (a variable valve event and lift system: VEL) that variably controls working angle and valve lift amount of an intake valve functioning as an engine valve. In the case of in-line three-cylinder engine, FIG. 1 shows a first cylinder #1, a second cylinder #2 and a third cylinder #3 serially from a right side of FIG. 1. In the case of one bank of the V-six-cylinder engine, FIG. 1 corresponds to a first cylinder #1, a third cylinder #3 and a fifth cylinder #5 of the V-six-cylinder engine serially from the right side of FIG. 1. In the following descriptions, the case of in-line three-cylinder engine will be explained.

First Embodiment

Figure 2:
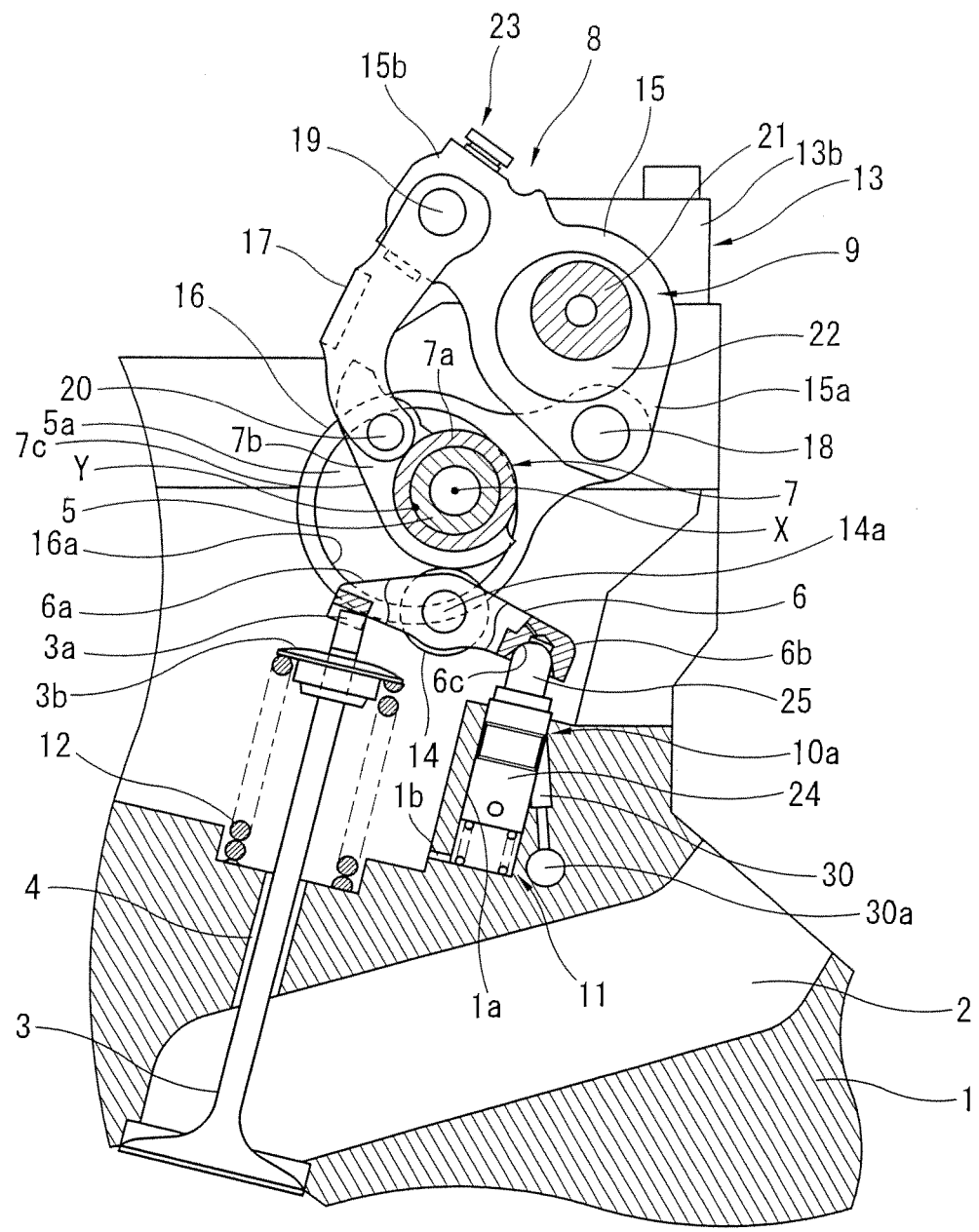
FIG. 2 is a sectional view of FIG. 1, taken along a line A-A.
Figure 3:
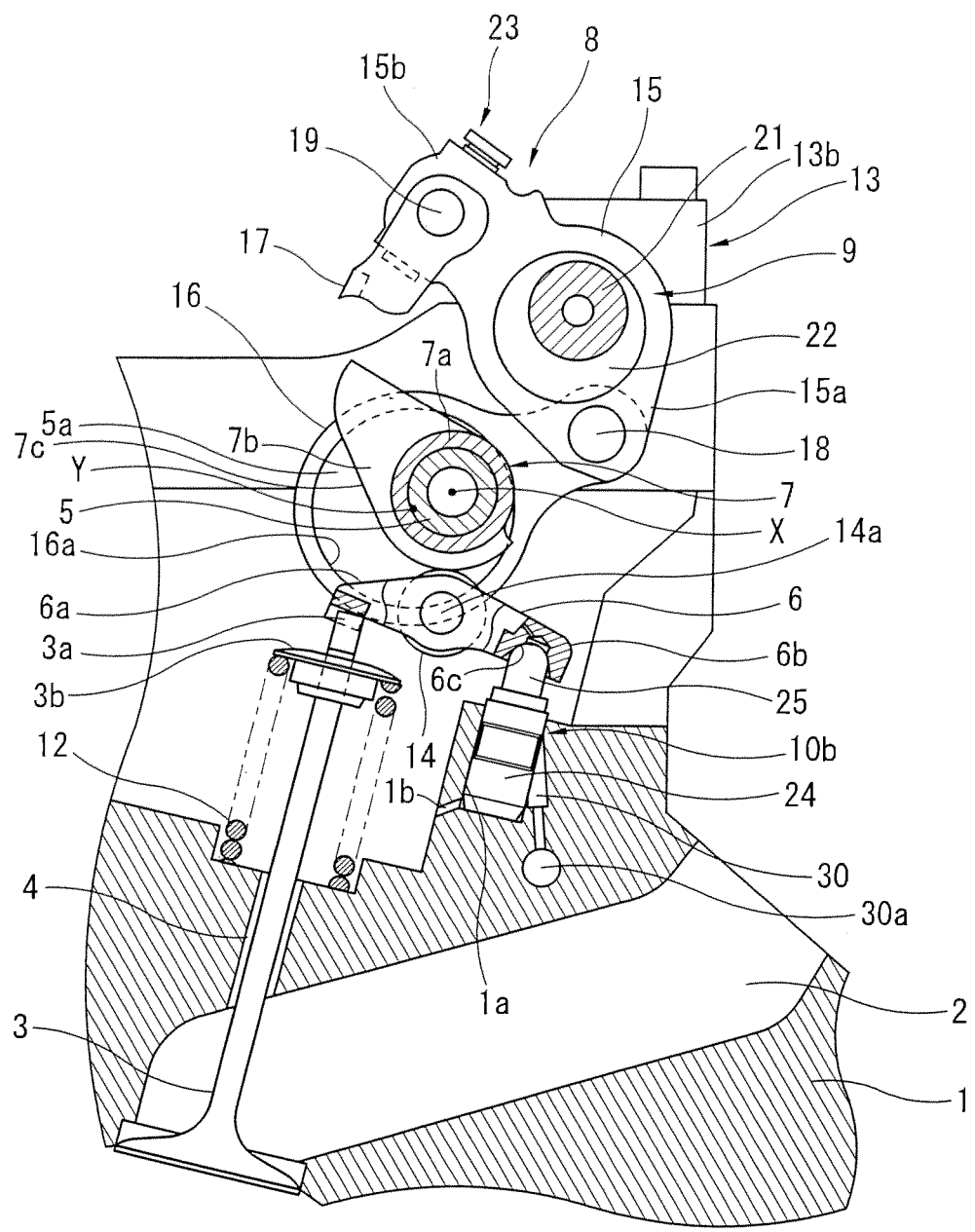
FIG. 3 is a sectional view of FIG. 1, taken along a line B-B.

FIGS. 1 to 3 show a first embodiment according to the present invention. The variable valve system, the control apparatus or the variable valve apparatus includes two of first and second intake valves 3 per one cylinder, a drive shaft 5, a pair of swing cams 7 per one cylinder, a transmitting mechanism 8, a control mechanism 9, first and second hydraulic lash adjusters 10a and 10b per one cylinder, and three valve stop mechanisms 11. The first and second intake valves 3 open and close a pair of intake ports 2 formed inside a cylinder head 1. The drive shaft 5 extends in a front-rear direction of the engine, above the first to third cylinders #1-#3. The drive shaft 5 includes three drive cams 5a formed in an outer circumference of the drive shaft 5. The pair of swing cams 7 are rotatably supported by an outer circumferential surface of the drive shaft 5. Each of the pair of swing cams 7 opens and closes the corresponding intake valve through a swing arm 6 (functioning as an interposed member). The transmitting mechanism 8 converts a rotative force of the drive cam 5a into a swinging force, and transmits the swinging force to the swing cams 7. The control mechanism 9 controls working angle and lift amount of each of the first and second intake valves 3 through the transmitting mechanism 8. The first and second hydraulic lash adjusters 10a and 10b are held by the cylinder head 1, and function as two pivots (fulcrum members) each of which removes or eliminates a valve clearance (lash) between the intake valve 3 and the swing cam 7 through the swing arm 6. Each of the three valve stop mechanisms 11 stops or suspends an opening-and-closing operation of the first intake valve 3 by the first hydraulic lash adjuster 10a in accordance with an operating state of the engine.

It is noted that the drive shaft 5, the swing cam 7, the transmitting mechanism 8 and the control mechanism 9 constitute the variable lift mechanism.

For convenience sake, respective structural elements for one cylinder (e.g., the first cylinder #1) will be explained in the following descriptions.

Each intake valve 3 is slidably held by the cylinder head 1 through a valve guide 4. Each intake valve 3 is biased in a closing direction thereof by a valve spring 12. Each valve spring 12 is located between an upper surface of the inside of the cylinder head 1 and a spring retainer 3b provided near a stem end 3a of the intake valve 3. Accordingly, the valve spring 12 is elastically in contact with the spring retainer 3b and the upper surface of the inside of the cylinder head 1.

The drive shaft 5 is rotatably supported through a cam shaft 7a of the swing cam 7 by a plurality of bearing portions 13 provided at an upper end portion of the cylinder head 1. A timing pulley (not shown) is provided at one end portion of the drive shaft 5. Rotative force of a crankshaft is transmitted through the timing pulley to the drive shaft 5 by means of a timing belt. One drive cam 5a is provided per one cylinder and located at the outer circumference of the drive shaft 5. A center (axis) Y of each drive cam 5a is eccentric (deviated) from a shaft center (axis) X of the drive shaft 5 in a radial direction of the drive shaft 5. A cam profile of an outer circumference of the drive cam 5a is formed in a substantially circular shape.

One end portion 6a of each swing arm 6 has a lower surface formed in a flat or slightly-convex shape. This lower surface of the one end portion 6a is in contact with the stem end 3a of the intake valve 3. Another end portion 6b of each swing arm 6 has a lower surface formed in a concave shape. This concave portion (lower surface) 6c of the another end portion 6b is in contact with the hydraulic lash adjuster 10a or 10b. A receiving hole is formed in a center portion of the swing arm 6. A roller 14 is accommodated in the receiving hole of the swing arm 6, and is rotatably received through a roller shaft 14a by the swing arm 6.

As shown in FIG. 1, two swing cams 7 are formed integrally with the cam shaft 7a. That is, the cam shaft 7a formed in a circular-tube shape has both end portions each of which is formed integrally with the swing cam 7. A lower surface of each swing cam 7 includes a cam surface 7b which has a base circle surface, a ramp surface and a lift surface. An upper surface of the roller 14 of the swing arm 6 becomes in rotatable contact with (one of) the base circle surface, the ramp surface and the lift surface in accordance with a swing position of the swing cam 7.

The cam shaft 7a includes a journal portion formed at a substantially center portion of an outer circumferential surface of the cam shaft 7a with respect to an axial direction of the cam shaft 7a. The journal portion of the cam shaft 7a is rotatably supported by the bearing portion 13 with a minute clearance therebetween. An inner circumferential surface of the cam shaft 7a rotatably supports the outer circumferential surface of the drive shaft 5.

The transmitting mechanism 8 includes a rocker arm 15, a link arm 16 and a link rod 17. The rocker arm 15 is disposed above the drive shaft 5. The link arm 16 links one end portion 15a of the rocker arm 15 with the drive cam 5a. The link rod 17 links another end portion 15b of the rocker arm 15 with one swing cam 7.

The rocker arm 15 includes the one end portion 15a, the another end portion 15b, and a tubular base portion located at a center portion of the rocker arm 15. The tubular base portion is rotatably supported through a supporting hole thereof by an after-mentioned control cam. The one end portion 15a of the rocker arm 15 is rotatably connected with the link arm 16 by a pin 18 whereas the another end portion 15b of the rocker arm 15 is rotatably connected with an upper end portion of the link rod 17 by a pin 19.

The link arm 16 includes an annular base portion (circular tube portion) and a protruding end. A fitting hole 16a is formed at a center portion of the annular base portion. The fitting hole 16a is rotatably fitted over an outer circumferential surface of a cam main body of the drive cam 5a. The protruding end of the link arm 16 is connected with the one end portion 15a of the rocker arm 15 by the pin 18.

A lower end portion of the link rod 17 is rotatably connected with a cam nose portion of the swing cam 7 by a pin 20.

An adjusting mechanism 23 for performing a fine adjustment of lift amount of each intake valve 3 at the time of assembly of respective structural components is provided between the another end portion 15b of the rocker arm 15 and the upper end portion of the link rod 17.

The control mechanism 9 includes a control shaft 21 and the control cam 22. The control shaft 21 is rotatably supported above the drive shaft 5 by the same bearing portions. The control cam 22 is attached to an outer circumference of the control shaft 21 and is slidably fitted into the supporting hole of the rocker arm 15 such that the control cam 22 functions as a swing fulcrum for the rocker arm 15.

The control shaft 21 is disposed substantially parallel to the drive shaft 5, i.e. in the front-rear direction of the engine. The control shaft 21 is rotationally controlled by an actuator 50 shown in FIG. 6. The control cam 22 is formed in a cylindrical shape (circular-tube shape). An axis (cam center) of the cylindrical control cam 22 is eccentric (deviated) by a predetermined amount from an axis of the control shaft 21.

Figure 6:
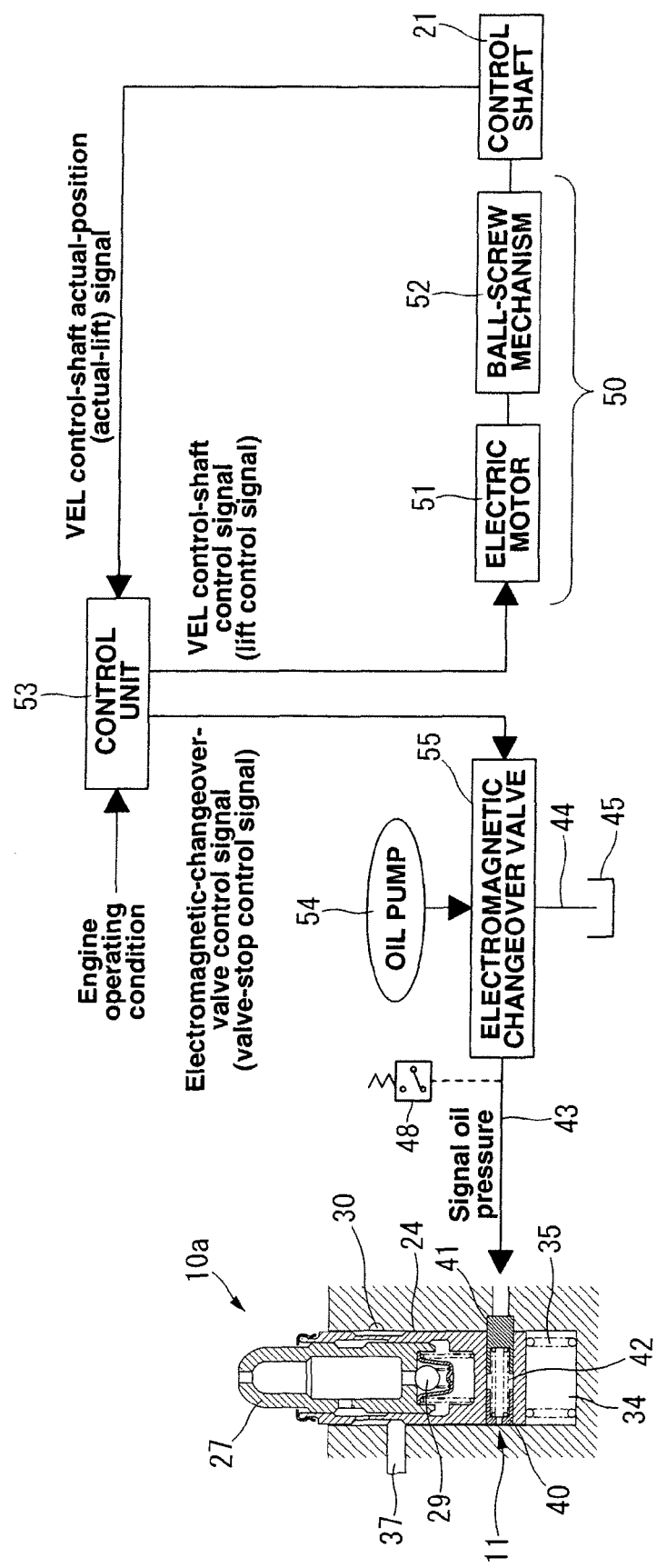
FIG. 6 is a schematic view showing a control hydraulic circuit in the first embodiment.

As shown in FIG. 6, the actuator 50 includes an electric motor 51 and a ball-screw mechanism 52. The electric motor 51 is fixed to one end portion of a housing (not shown). The ball-screw mechanism 52 includes a ball-screw element and a link and the like. The ball-screw mechanism 52 is provided inside the housing, and functions as a speed-reduction mechanism which transmits a rotational drive force of the electric motor 51 to the control shaft 21.

The electric motor 51 is a proportional DC motor. The electric motor 51 is controlled between forward and reverse rotations, by control signals derived from an after-mentioned control unit 53 which detects the operating state of the engine.

As shown in FIGS. 1 to 5, each of the first and second hydraulic lash adjusters 10a and 10b includes a body 24, a plunger 27, a high-pressure chamber 28, and a check valve 29. The body 24 is formed in a cylindrical (circular-tube) shape having its bottom. The body 24 is retained to be able to slide in an up-down direction inside a cylindrical retaining hole 1a of the cylinder head 1. The plunger 27 is received by the body 24 to be able to slide in the up-down direction inside the body 24. The plunger 27 is formed with a reservoir chamber 26 located inside the plunger 27. The reservoir chamber 26 is partitioned by a partition wall 25 integrally formed with a lower portion of the plunger 27. The high-pressure chamber 28 is formed inside a lower portion of the body 24. The high-pressure chamber 28 is communicated through a communication hole 25a with the reservoir chamber 26. The communication hole 25a is formed in the partition wall 25 to pass through the partition wall 25. The check valve 29 is provided in the high-pressure chamber 28. The check valve 29 permits working oil of the reservoir chamber 26 to flow toward the high-pressure chamber 28, and prohibits the reverse flow. Moreover, a discharge hole 1b through which working oil retained in the retaining hole 1a is discharged to the external is formed in the cylinder head 1.

A first concave groove 24a is formed in an outer circumferential surface of the body 24. The first concave groove 24a has a cylindrical (circular-tube) shape. A first passage hole 31 is formed in a circumferential wall of the body 24 (i.e., in a circumferential wall of the first concave groove 24a) to pass through the body 24 in a radial direction of the body 24. The first passage hole 31 communicates an oil passage 30 with an inside of the body 24. The oil passage 30 is formed in the cylinder head 1 such that a downstream end of the oil passage 30 is open to the first concave groove 24a.

Figures 4A, 4B:
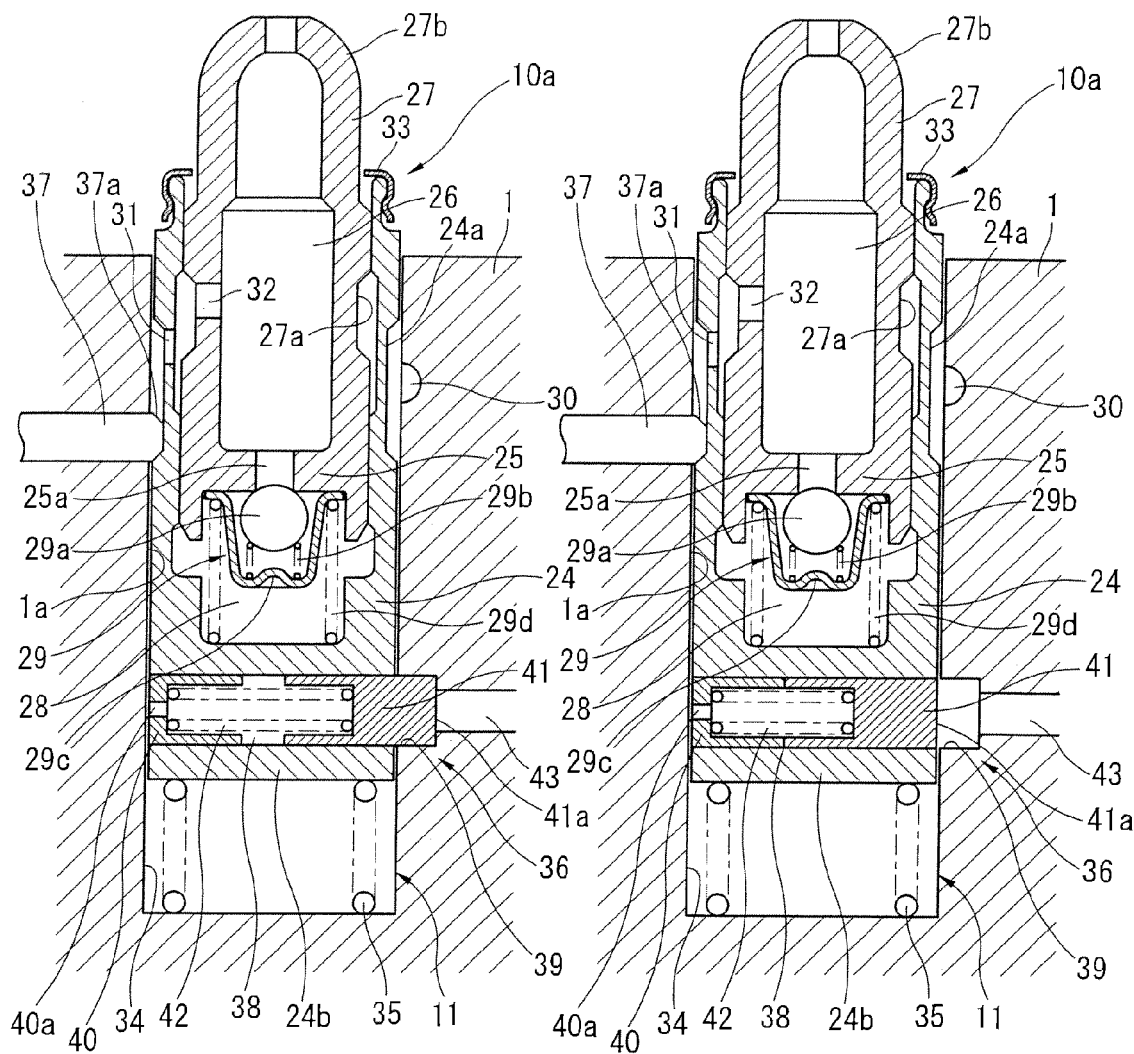
FIG. 4A is a longitudinal sectional view showing a first hydraulic lash adjuster and a valve stop mechanism provided in the first embodiment.
FIG. 4B is a longitudinal sectional view showing an action of the first hydraulic lash adjuster and the valve stop mechanism.
Figure 5:
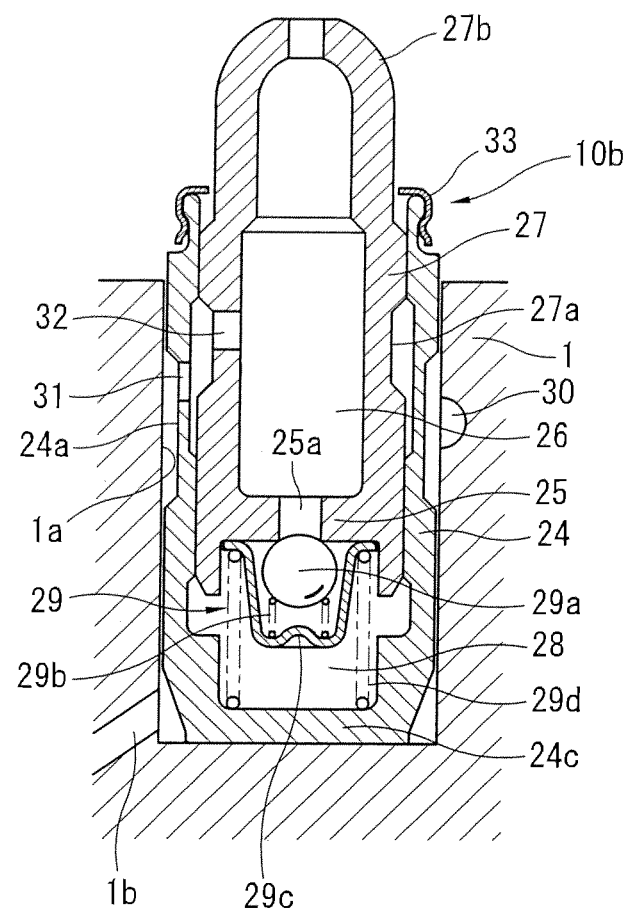
FIG. 5 is a longitudinal sectional view showing a second hydraulic lash adjuster provided in the first embodiment.

As shown FIGS. 4A and 4B, the body 24 of the first hydraulic lash adjuster 10a has a bottom portion 24b which extends in the lower direction beyond a bottom portion of the body 24 of the second hydraulic lash adjuster 10b. The bottom portion 24b of the body 24 of the first hydraulic lash adjuster 10a is formed substantially in a cylindrical column shape.

The oil passage 30 communicates with a main oil gallery 30a formed in the cylinder head 1 for a lubricating-oil supply. As shown in FIG. 6, lubricating oil is pressured and supplied from an oil pump 54 to the main oil gallery 30a.

A second concave groove 27a is formed in a substantially axially-center portion of an outer circumferential surface of the plunger 27. The second concave groove 27a has a cylindrical (circular-tube) shape. A second passage hole 32 is formed in a circumferential wall of the plunger 27 (i.e., in a circumferential wall of the second concave groove 27a) to pass through the plunger 27 in a radial direction of the plunger 27. The second passage hole 32 communicates the first passage hole 31 with the reservoir chamber 26. Moreover, a tip surface of a tip head portion 27b of the plunger 27 is formed in a spherical shape such that the tip surface of the tip head portion 27b favorably slides in contact with a spherical shape of the lower-surface concave portion 6c of the another end portion 6b of the swing arm 6.

A maximum projecting amount (i.e., a maximum upward sliding motion) of the plunger 27 is restricted or limited by an annular stopper member 33 fixedly fitted over an upper end portion of the body 24.

An axial width of the second concave groove 27a is relatively large such that the first passage hole 31 is constantly in communication with the second passage hole 32 even when the plunger 27 takes any sliding position in the up-down direction relative to the body 24.

The check valve 29 includes a check ball 29a, a first coil spring 29b, a retainer 29c, and a second coil spring 29d. The check ball 29a opens and closes a lower opening edge (sheet) of the communication hole 25a. The first coil spring 29b biases the check ball 29a in a closing direction of the check ball 29a. The retainer 29c is formed in a cup shape and retains the first coil spring 29b. The second coil spring 29d is attached to have elasticity between an inner bottom surface of a bottom wall 24c of the body 24 and an annular upper end portion of the retainer 29c. The second coil spring 29d biases the retainer 29c toward the partition wall 25 and also biases the whole plunger 27 in the upper direction.

In a region of the base circle surface of the swing cam 7, the hydraulic pressure inside the high-pressure chamber 28 is lowered in response to the projecting movement (upward movement) of the plunger 27 caused by biasing force of the second coil spring 29d. At this time, working oil supplied from the oil passage 30 into the retaining hole 1a flows from the first concave groove 24a through the first passage hole 31, the second concave groove 27a and the second passage hole 32 into the reservoir chamber 26. Thereby, the check ball 29a is pressed and opened against the biasing force of the first coil spring 29b, so that working oil flows into the high-pressure chamber 28.

Hence, the plunger 27 upwardly pushes the another end portion 6b of the swing arm 6. Thereby, a clearance between the one end portion 6a of the swing arm 6 and the stem end 3a of the intake valve 3 is adjusted to zero (zero lash) through the contact between the roller 14 and the swing cam 7.

In a region of the lift surface of the swing cam 7, a downward load is applied to the plunger 27 such that the hydraulic pressure inside the high-pressure chamber 28 is increased. Thereby, oil inside the high-pressure chamber 28 leaks from a clearance between the plunger 27 and the body 24 so that the plunger 27 slightly moves in the downward direction (leak down).

When the base circle surface of the swing cam 7 becomes in contact with the roller 14 again, the clearance of each portion is adjusted to zero lash by the projecting movement (upward movement) of the plunger 27 caused by the biasing force of the second coil spring 29d, as mentioned above.

Each of the first and second hydraulic lash adjusters 10a and 10b has such a lash adjusting function.

On the other hand, only the first hydraulic lash adjuster 10a has the valve stop mechanism 11 as shown in FIGS. 4A and 4B. The valve stop mechanism 11 includes a sliding hole 34, a lost-motion spring 35, and a restricting mechanism 36. The sliding hole 34 has a cylindrical-column shape, and is formed to be continuous with a bottom side of the retaining hole 1a (i.e., formed integrally with the retaining hole 1a). The lost-motion spring 35 is elastically attached between a bottom surface of the sliding hole 34 and a lower surface of the body 24, and thereby biases the first hydraulic lash adjuster 10a in the upward direction. The restricting mechanism 36 restricts or limits a lost motion of the first hydraulic lash adjuster 10a.

An inner diameter of the sliding hole 34 is equal to an inner diameter of the retaining hole 1a. The sliding hole 34 holds the body 24 such that the body 24 is able to slide on an inner surface of the sliding hole 34 continuously from an inner surface of the retaining hole 1a in the up-down direction.

The lost-motion spring 35 is a coil spring. The lost-motion spring 35 biases the lower surface of the body 24 in the upward direction such that the tip portion 27b of the plunger 27 is in elastic contact with the lower surface of the another end portion 6b of the swing arm 6.

A maximum position of the upward (sliding) movement of the body 24 is restricted by a stopper pin 37 inserted into the cylinder head 1. That is, the stopper pin 37 is disposed in the cylinder head 1 toward the body 24, i.e. extends perpendicularly to the axial direction of the body 24. A tip portion 37a of the stopper pin 37 protrudes up to the inside of the first concave groove 24a, and is able to slide in the first concave groove 24a. In response to the upward movement of the body 24, the tip portion 37a becomes in contact with a lower edge of the first concave groove 24a so that the maximum position of the upward sliding of the body 24 is limited.

By so doing, the first hydraulic lash adjuster 10a performs the lost motion by moving in the upper and lower directions (in stroke motion) between the retaining hole 1a and the sliding hole 34 by means of spring force of the lost-motion spring 35 in dependence upon the swing of the swing arm 6. Thereby, the first hydraulic lash adjuster 10a loses the function as the swing fulcrum for the swing arm 6, so that the opening and closing operations of the first intake valve 3 are stopped or suspended.

The restricting mechanism 36 mainly includes a moving hole 38, a restricting hole 39, a retainer 40, a restricting pin 41, and a return spring 42. The moving hole 38 is formed in the bottom portion 24b of the body 24 to pass through the body 24 in the radial direction of the body 24. The restricting hole 39 is formed in the cylinder head 1 such that the restricting hole 39 extends perpendicularly to the axial direction of the retaining hole 1a. The retainer 40 is fixed to one end side (of an inner wall) of the moving hole 38. The restricting pin 41 is provided in the moving hole 38 to be able to slide on the inner wall of the moving hole 38. The restricting pin 41 is able to move in both of the moving hole 38 and the restricting hole 39 such that the restricting pin 41 straddles a boundary between the moving hole 38 and the restricting hole 39. The return spring 42 is elastically attached between the retainer 40 and a back end portion of the restricting pin 41, and biases the restricting pin 41 toward the restricting hole 39.

A position of the restricting hole 39 accords with (becomes equal to) a position the moving hole 38 with respect to the axial direction of the body 24 when the body 24 takes its maximum upper position (i.e., takes an upper-limit position restricted by the stopper pin 37). An inner diameter of the restricting hole 39 is substantially equal to an inner diameter of the moving hole 38. A signal hydraulic pressure is introduced from an oil passage hole 43 into one end side of the restricting hole 39. The oil passage hole 43 is formed in the cylinder head 1.

It is noted that a rotation of the body 24 can be easily restricted in the following manner. That is, a protruding amount of the stopper pin 37 (into the retaining hole 1a) is slightly increased whereas a slit is formed in an inner surface of the first concave groove 24a of the body 24 in a longitudinal direction of the body 24. This slit is made to engage with a tip of the stopper pin 37. Alternatively, a separate rotation-restricting member may be provided between the cylinder head 1 and the body 24.

The retainer 40 is formed in a circular-tube shape having its bottom. An air hole 40a is formed in the bottom portion of the retainer 40 to pass through the bottom portion in an axial direction of the retainer 40. This air hole 40a is provided in order to secure a smooth movement of the restricting pin 41. As shown in FIG. 4B, an axial length of the retainer 40 is set such that a front edge of the retainer 40 becomes in contact with a back end of the restricting pin 41 to stop a further backward movement of the restricting pin 41 when whole of the restricting pin 41 becomes located (completely) inside the moving hole 38.

The restricting pin 41 is formed in a solid cylindrical-column shape. An outer diameter of the restricting pin 41 is slightly smaller than the inner diameters of the moving hole 38 and the restricting hole 39 so that a smooth sliding performance of the restricting pin 41 is ensured. Moreover, a pressure-receiving surface of a front end portion 41a of the restricting pin 41 receives hydraulic pressure supplied from the oil passage hole 43 to restricting hole 39. Thereby, the restricting pin 41 backwardly moves against the spring force of the return spring 42, so that the front end portion 41a gets out of the restricting hole 39. Thereby, whole of the restricting pin 41 becomes accommodated inside the moving hole 38 to release the restriction of the body 24 (i.e., to release the restriction of the lost motion of the first hydraulic lash adjuster 10a).

As shown in FIG. 6, hydraulic pressure pumped and fed by the oil pump 54 is supplied through an electromagnetic changeover valve 55 to the oil passage hole 43 (and the restricting hole 39) as the signal hydraulic pressure. A hydraulic switch 48 which opens and closes according to a magnitude of the signal hydraulic pressure is provided. The hydraulic switch 48 monitors an actual hydraulic pressure passing though the oil passage hole 43, and outputs an ON signal to the after-mentioned control unit 53 when the actual hydraulic pressure is higher than a predetermined pressure. On the other hand, the hydraulic switch 48 outputs an OFF signal to the control unit 53 when the actual hydraulic pressure is lower than the predetermined pressure.

The electromagnetic changeover valve 55 includes a valve body (not shown) and a spool valve slidably provided inside the valve body. The spool valve is moved to perform a two-stage changeover between ON state and OFF state by means of a biasing force of coil spring and an electromagnetic force of solenoid. By supplying or not supplying a control electric-current from the control unit 53 to the solenoid, the spool valve communicates a discharge passage of the oil pump 54 with the oil passage hole 43 or communicates a drain passage 44 with the oil passage hole 43 by closing the discharge passage of the oil pump 54. That is, the electromagnetic changeover valve 55 controls the signal hydraulic pressure in a stepwise manner between the two stages of large and small levels.

The control unit 53 detects the operating state (operating condition) of the engine on the basis of information signals derived from various sensors such as a crank angle sensor, an air flow meter, a water temperature sensor and a throttle-valve opening sensor. The control unit 53 also detects a signal of rotation angle θ derived from a rotational-position sensor (not shown) for sensing a current rotational position of the control shaft 21. The control unit 53 drivingly controls the electric motor 51 and controls the rotational position of the control shaft 21 by way of feedback control, on the basis of the operating state of the engine and the signal of rotation angle θ. Accordingly, the lift amount L and the working angle D of each intake valve 3 can be varied according to the operating state of the engine.

The control unit 53 is an electronic controller. The control unit 53 includes a rotational-speed limiting circuit as an engine-speed limiting section or means. This rotational-speed limiting circuit limits and varies a maximum rotational speed of the internal combustion engine in accordance with a displacement amount of the lost motion of the valve stop mechanism 11. The rotational-speed limiting circuit detects the rotation angle θ derived from the rotational-position sensor for the control shaft 21, as (a relevant factor of) the displacement amount of the lost motion of the valve stop mechanism 11. Then, the rotational-speed limiting circuit limits and varies the engine rotational speed by receiving the information of current engine rotational speed derived from the crank angle sensor.

[Operations of Variable Valve Apparatus]

Operations of the variable valve apparatus in the first embodiment will now be explained.

In a low engine-speed region, the electric motor 51 is rotatively driven by the control electric-current outputted from the control unit 53. This rotation torque of the electric motor 51 is transmitted through the ball-screw mechanism 52 to the control shaft 21. Thereby, the control shaft 21 is rotated in one direction. Hence, as shown in FIGS. 7A, 7B, 8A and 8B, also the control cam 22 is rotated in the one direction such that the axis of the control cam 22 rotates or moves around the axis of the control shaft 21 to keep a constant distance between the axis of the control cam 22 and the axis of the control shaft 21. Thereby, a radially thick portion of the control cam 22 relative to the axis of the control shaft 21 moves in a right upper direction away from the drive shaft 5 up to a position denoted by a rotation angle θ1. Hence, a pivot (the connecting pin 19) between the another end portion 15b of the rocker arm 15 and of the link rod 17 is moved in the upper direction relative to the drive shaft 5, so that a cam-nose side of the swing cam 7 is forcefully raised by the link rod 17.

Then, when the rotation of the drive cam 5a raises (upwardly pushes) the one end portion 15a of the rocker arm 15 through the link arm 16, the raised amount of the one end portion 15a is transmitted through the link rod 17 to each swing cam 7 and each swing arm 6. Thereby, each intake valve 3 opens against the spring force of the valve spring 12. At this time, the lift amount of the intake valve 3 takes a sufficiently small value denoted by L1.

In a case that the operating state of the engine has transferred from the low engine-speed region into a middle or high engine-speed region, the electric motor 51 rotates in the reverse direction by the control electric-current derived from the control unit 53. In response to this rotation, through the ball-screw mechanism 52, the control shaft 21 rotates the control cam 22 in another direction (clockwise direction) so that the axis of the control cam 22 moves in the lower (left) direction.

Thereby, the entire rocker arm 15 moves toward the drive shaft 5 such that the another end portion 15b presses the cam nose portion of the swing cam 7 through the link rod 17 in the lower direction. Hence, the entire swing cam 7 is rotated in the counterclockwise direction from the position shown in FIGS. 7A to 8B by a predetermined amount. Accordingly, the contact point (of the cam surface 7b) between the swing cam 7 and the outer circumferential surface of the roller 14 of the swing arm 6 moves toward the cam nose portion (i.e., toward a lift portion side).

Then, when the rotation of the drive cam 5a raises (upwardly pushes) the one end portion 15a of the rocker arm 15 through the link arm 16, each intake valve 3 is opened against the spring force of the valve spring 12 through the swing arm 6. It is noted that the lift amount of the intake valve 3 continuously varies up to a maximum value L4 (corresponding to a rotation angle θ4 of the control cam 22) in accordance with the rotational speed of the engine. That is, the lift amount of the intake valve 3 becomes larger as the rotational speed of the engine becomes higher. Therefore, an intake-air charging efficiency is improved to enhance an output power of the engine.

[Operations of Valve Stop Mechanism]

In the case that the lift amount of each intake valve 3 is in a small-lift-amount region when the engine is in a range from an idling state to the low-engine-speed region, the control electric-current is outputted from the control unit 53 to the electromagnetic changeover valve 55 in a specific operating condition in which an improvement of fuel economy is required. Thereby, a high discharge hydraulic pressure is introduced from the oil pump 54 through the oil passage hole 43 into the restricting hole 39 as the signal hydraulic pressure.

The restricting pin 41 receiving such a high signal hydraulic pressure moves in the backward direction against the spring force of the return spring 42, so that the front end portion 41a moves out of the restricting hole 39. Hence, the lock of the first hydraulic lash adjuster 10a relative to the cylinder head 1 is released.

As a result, whole of the first hydraulic lash adjuster 10a becomes able to perform the lost motion as shown in FIG. 4B. Accordingly, the first hydraulic lash adjuster 10a repeats the upward movement and the downward movement inside the retaining hole 1a and the sliding hole 34 by means of the spring force of the lost-motion spring 35. That is, the first hydraulic lash adjuster 10a becomes in a lost-motion state. Thereby, the first intake valve 3 does not open, i.e. maintains the closed state (valve-movement stopped state).

Figure 7A:
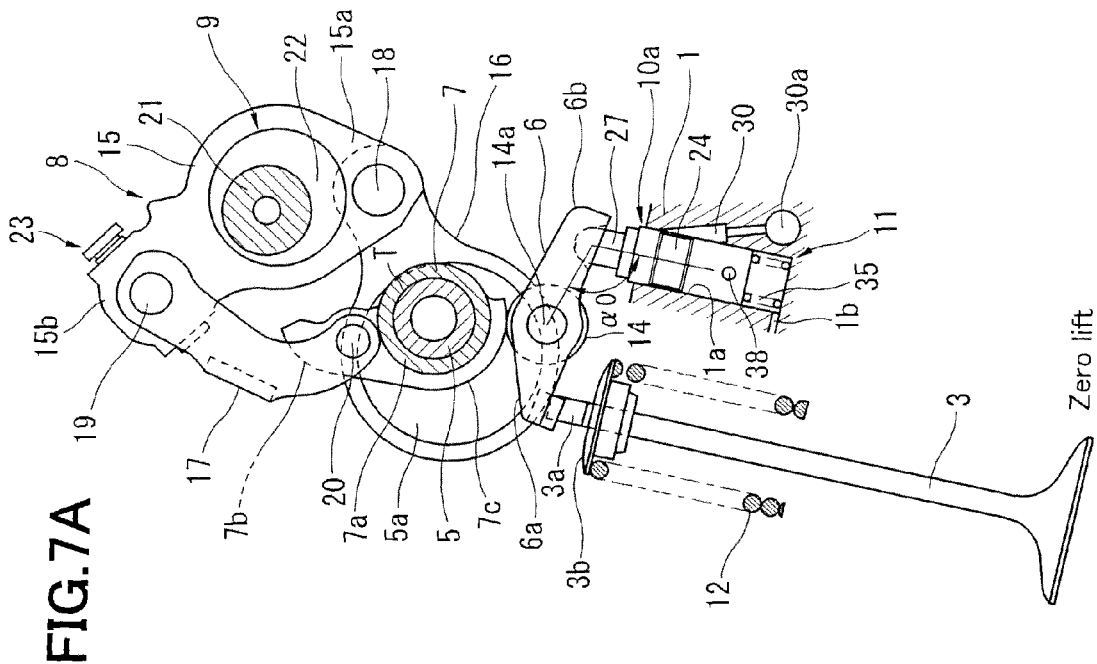
FIG. 7A is a view for explaining operations of the first hydraulic lash adjuster and the valve stop mechanism at the time of valve-closed state in a case that a lift amount of a first intake valve is equal to L1 in the first embodiment.
Figure 7B:
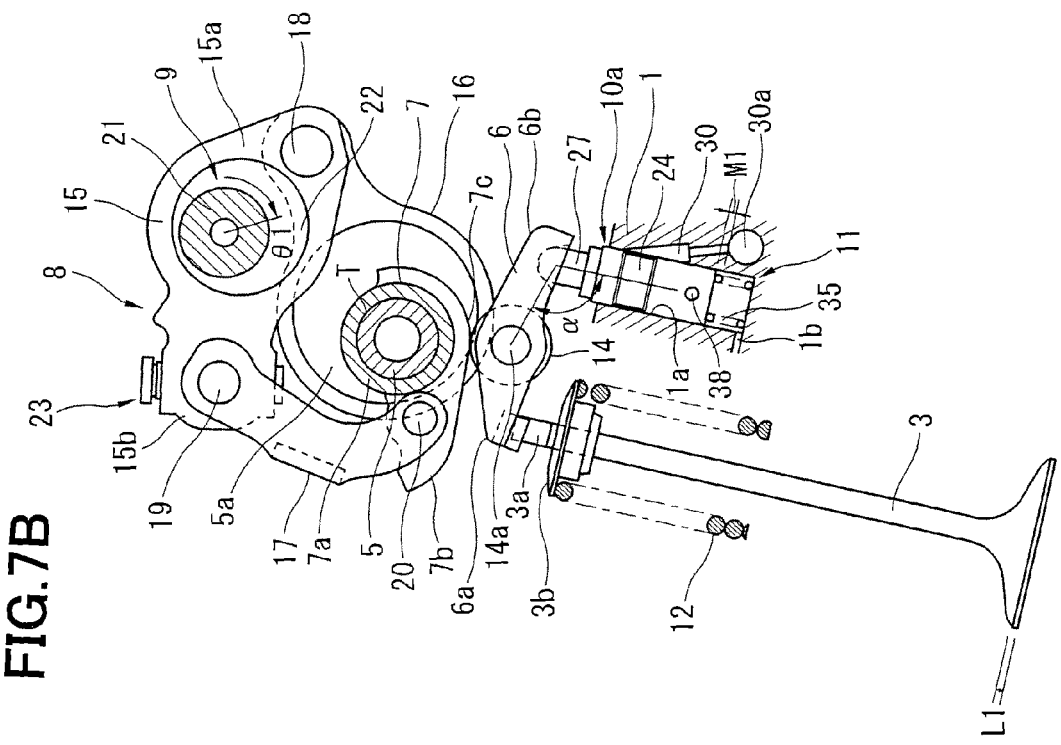
FIG. 7B is a view for explaining the operations of the first hydraulic lash adjuster and the valve stop mechanism at the time of valve-open state in the case that the lift amount of the first intake valve is equal to L1 in the first embodiment.
Figure 9:
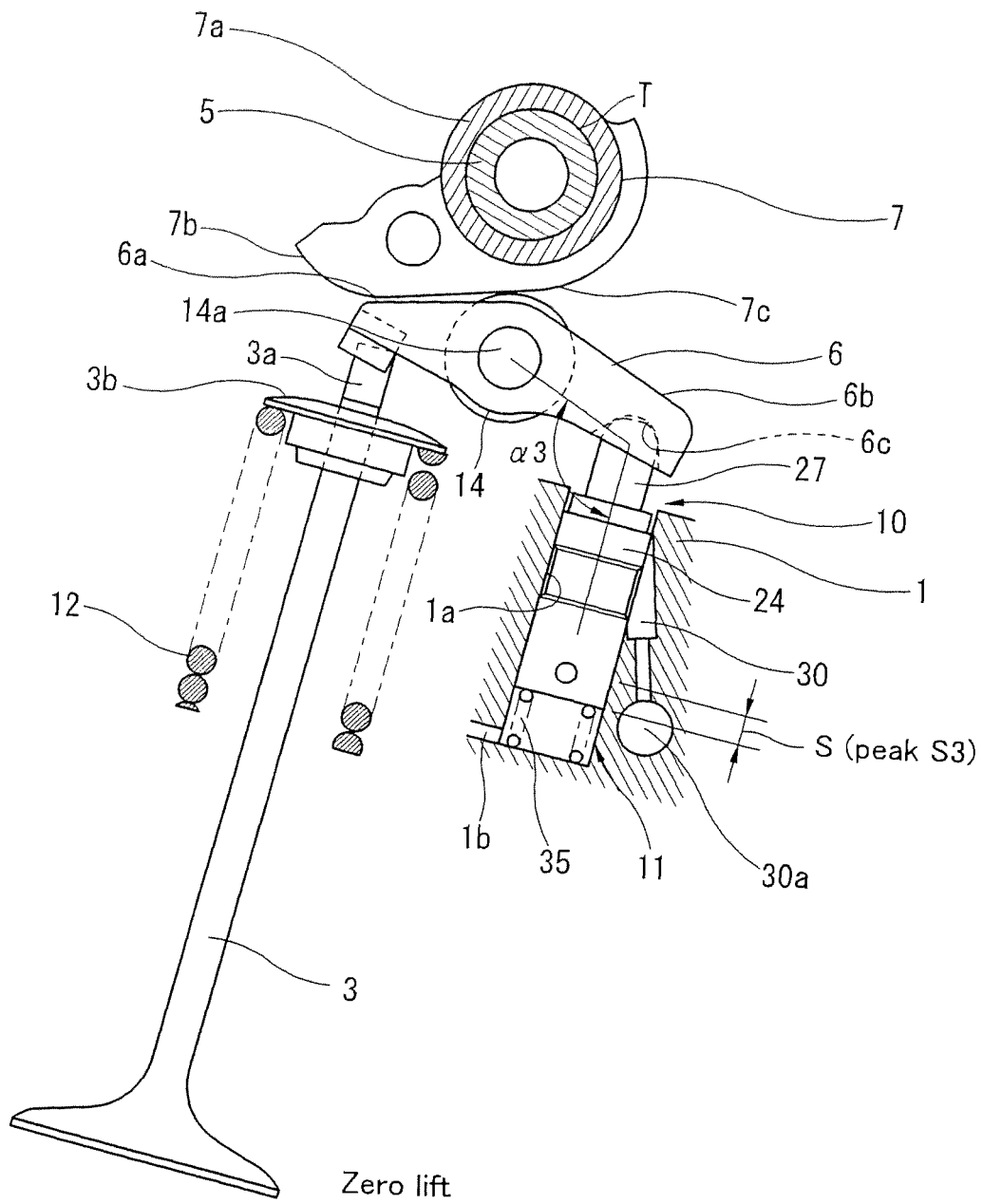
FIG. 9 is a view for explaining operations of the first hydraulic lash adjuster and the valve stop mechanism when the first intake valve is under a valve-stopping control in a case that the lift amount of the second intake valve is equal to L3 in the first embodiment.

That is, before the valve-movement stopped state, the swing cam 7 rotates between a zero-lift position (valve-closed position) shown in FIG. 7A and a maximum lift position (maximum valve-opened position) shown in FIG. 7B, so that the lift amount takes the value L1, for example. Contrary to this, under the valve-movement stopped state, the first hydraulic lash adjuster 10a performs the lost motion with a stroke amount M1 shown in FIG. 7B even when the swing cam 7 swings to the maximum lift position. Accordingly, the first intake valve 3 is not lifted actually. At this time, an open angle α (see FIG. 7B) formed between the swing arm 6 and the first hydraulic lash adjuster 10a becomes relatively large when the swing cam 7 is located in the maximum lift position (peak-lift position). However, this open angle α does not become excessively large. It is noted that the open angle α is formed between an axis (longitudinal center line) of the first hydraulic lash adjuster 10a and an imaginary line connecting a center of the roller shaft 14a with a center of the spherical shape of the tip head portion 27b, in a plane perpendicular to the axial direction of the drive shaft 5 as shown in FIGS. 7A, 7B and 9.

Therefore, a smooth operation under the valve-movement stopped state is obtained even when the swing cam 7 is located in the maximum lift position (peak-lift position).

Figure 8A:
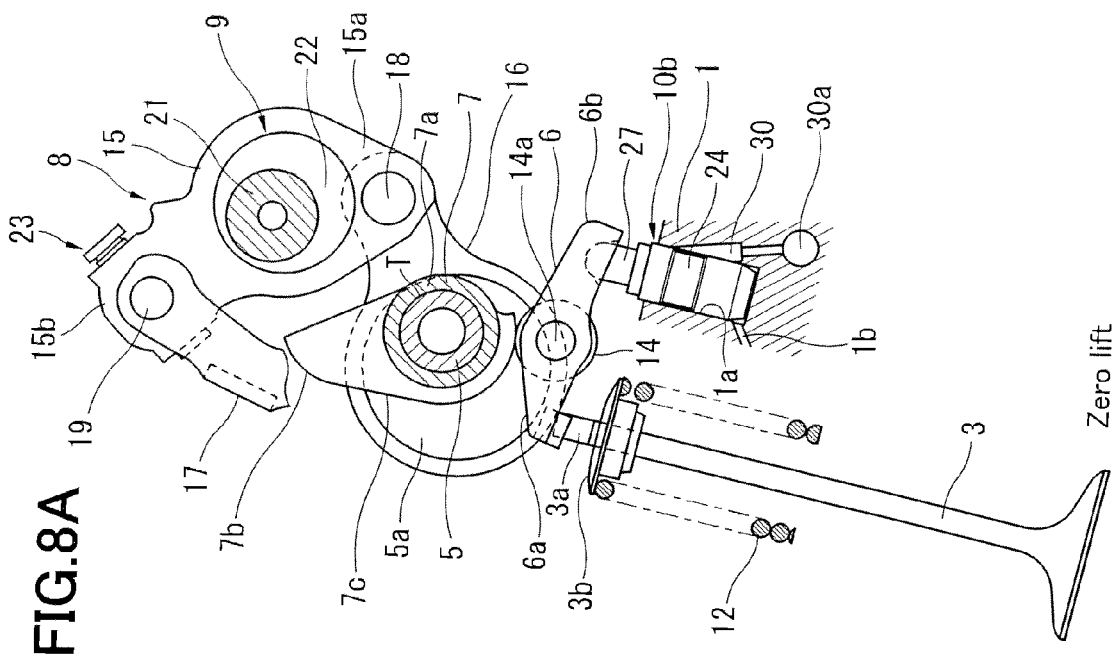
FIG. 8A is a view for explaining an operation of the second hydraulic lash adjuster at the time of valve-closed state in a case that a lift amount of a second intake valve is equal to L1 in the first embodiment.
Figure 8B:
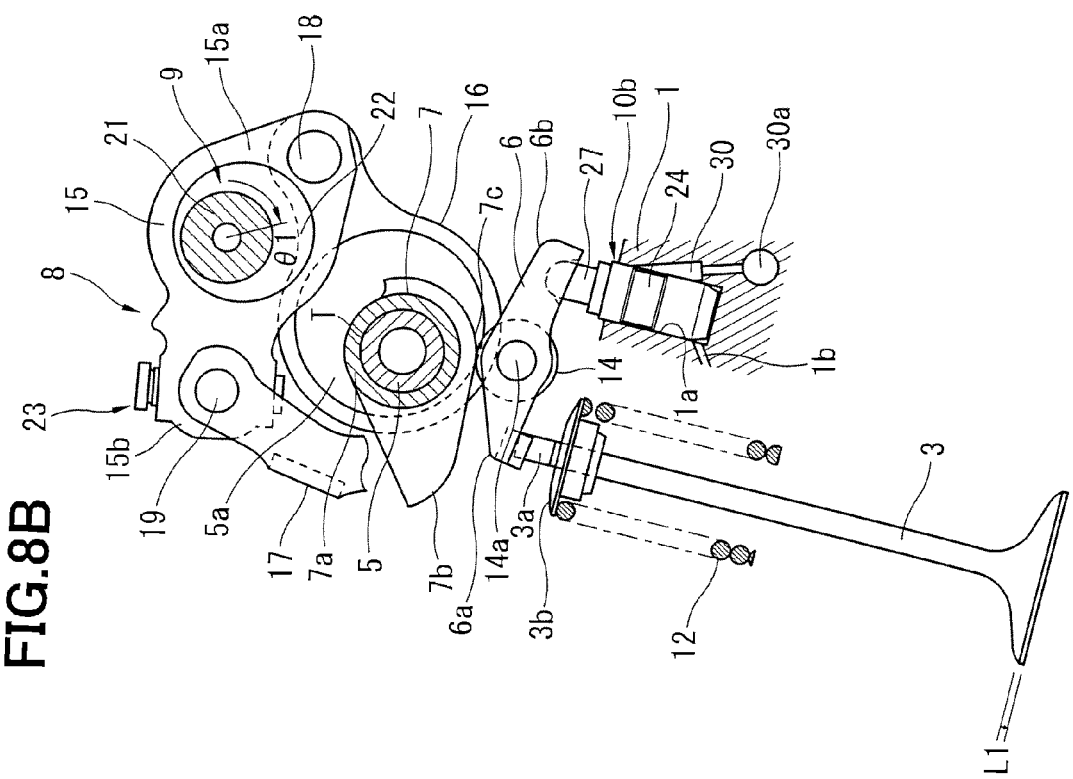
FIG. 8B is a view for explaining the operation of the second hydraulic lash adjuster at the time of valve-open state in the case that the lift amount of the second intake valve is equal to L1 in the first embodiment.

On the other hand, the second hydraulic lash adjuster 10b always functions as the swing fulcrum for the second swing arm 6 as shown in FIGS. 8A and 8B. Hence, the second intake valve 3 opens and closes with the lift amount L1 even under the valve-movement stopped state of the first intake valve 3. Therefore, an induction swirl is enhanced to improve the combustion and the fuel economy.

Next, the lost motion in the following case will now be explained. That is, a desired torque has increased with a further increase of the engine speed, and hence, the one-valve-lift operating state has been again replaced with two-valve-lift operating state. Moreover, the lift amount of each intake valve has been increased such that the control shaft 21 has rotated in the clockwise direction to a rotation angle θ3. In other words, the lost motion in the case that both the intake valves 3 have the lift amount L3 will now be considered.

Under this case, the open angle formed between the swing arm 6 and the first hydraulic lash adjuster 10a take a value α3 as shown in FIG. 9. This open angle α3 is fairly large. Hence, the contact between the tip head portion 27b of the first hydraulic lash adjuster 10a and the lower-surface concave portion 6c of the another end portion 6b of the first swing arm 6 tends to be non-uniform or uneven.

That is, normally, the tip head portion 27b of the first hydraulic lash adjuster 10a stably supports the lower-surface concave portion 6c of the another end portion 6b of the first swing arm 6 under a state where a contact between the lower-surface concave portion 6c and a roller(14)-side portion of a spherical portion of the tip head portion 27b is in a fine balance with a contact between the lower-surface concave portion 6c and a counter-roller(14)-side portion of the spherical portion of the tip head portion 27b. However, as the open angle α becomes larger, the contact between the lower-surface concave portion 6c and the roller(14)-side portion of the spherical portion of the tip head portion 27b moves in the upper direction whereas the contact between the lower-surface concave portion 6c and the counter-roller(14)-side portion of the spherical portion of the tip head portion 27b moves in the lower direction. That is, a contact portion of the roller (14)-side portion is shifted upwardly in the lower-surface concave portion 6c whereas a contact portion of the counter-roller(14)-side portion is shifted downwardly in the lower-surface concave portion 6c.

Under such a state, a load containing a lateral component is applied from the roller 14 to the first hydraulic lash adjuster 10a. That is, the load that contains a component acting perpendicular to a longitudinal direction of the first hydraulic lash adjuster 10a is applied to the first hydraulic lash adjuster 10a. As a result, a load level which is received by the contact between the lower-surface concave portion 6c and the roller (14)-side portion of the spherical portion of the tip head portion 27b is extremely increased, so that the above-mentioned balance is lost. Thereby, a localized contact between the lower-surface concave portion 6c and the spherical portion of the tip head portion 27b tends to be caused.

Also because the contact between the lower-surface concave portion 6c and the roller(14)-side portion of the spherical portion of the tip head portion 27b has moved in the upper direction, this contact tends to deviate due to the load containing the lateral component which is applied from the roller 14 or the like such that the first swing arm 6 deviates from the tip head portion 27b in a direction away from the intake valve 3. Such a tendency is not pronounced when the open angle α is near a value α1, specifically around 90 degrees, but becomes pronounced when the open angle α becomes near the value α3.

Next, a case that the engine speed has been further increased will now be considered. In such a high speed region, vibrations are caused due to slight deformations of valve-system components such as the swing arm and the swing cam. Due to these vibrations, a slight separation (a floating of the contact) occurs between the lower-surface concave portion 6c of the first swing arm 6 and the tip head portion 27b of the first hydraulic lash adjuster 10a.

Due to this separation phenomenon, the above-mentioned deviation becomes more pronounced. That is, the swing arm 6 easily deviates in the lateral direction (i.e., in the direction perpendicular to the longitudinal direction of the first hydraulic lash adjuster 10a) because a friction force is not produced when the separation (the floating of the contact) is occurring. Moreover, in some situations, there is a risk that the lower-surface concave portion 6c of the another end portion 6b of the first swing arm 6 is removed or detached from the tip head portion 27b.

The above-mentioned lateral deviation and the detachment of the first swing arm 6 are caused more easily as the open angle α becomes larger and/or as the rotational speed of the engine becomes higher. That is, the lateral deviation and detachment of the first swing arm 6 are easy to cause when the open angle α and/or the engine speed are great.

Therefore, one purpose according to the present invention is to prevent irregular behaviors such as the lateral deviation and the detachment of the first swing arm 6 by restricting an upper limit of the engine rotational speed to a lower value, for example, as the open angle α becomes greater.

Next, an operating characteristic of the lost motion of the valve stop mechanism 11 will now be considered concretely. In the example of FIG. 9, the displacement amount S of the lost motion takes a value S3 (e.g., 10 mm; 0.010 m) at its peak. When the swing cam 7 swings, the displacement S of the lost motion increases from zero to the peak value S3, and then decreases to zero.

In this case, the operating characteristic of the lost motion of the valve stop mechanism 11 is as follows.

Figure 10:
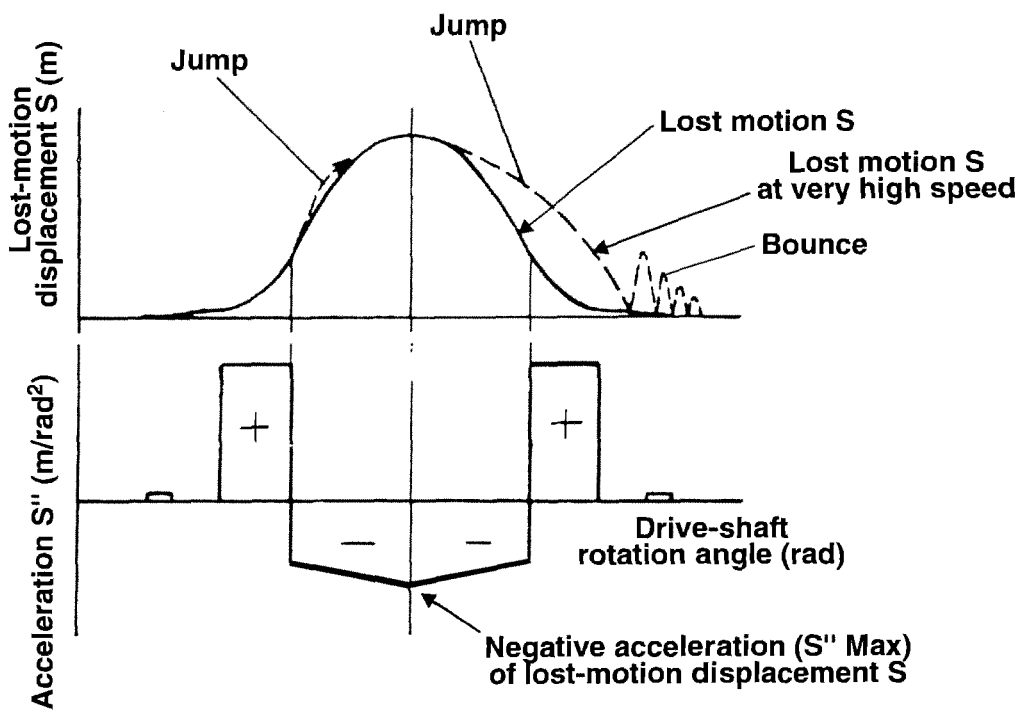
FIG. 10 is a characteristic view of a lost motion of the valve stop mechanism in the first embodiment.

A lift curve of the displacement S of the lost motion is shown by an upper graph of FIG. 10. An acceleration (m/rad²) of the displacement S is shown by a lower graph of FIG. 10 which corresponds to the upper graph. This acceleration is not shown with respect to a time, but is shown with respect to a rotation angle of the drive shaft. That is, the acceleration of the displacement S is a second-order differential with respect to the rotation angle (rad). Hence, a unit of this acceleration is "m/rad²"

An equivalent inertia weight Ms of the lost motion is a sum (for example, Ms=0.040 Kg) of a mass of the lash adjuster itself and a mass of a moving part of the swing arm 6 (about one-third of a mass of the swing arm 6). This equivalent inertia weight Ms is upwardly pushed by the lost-motion spring 35. A spring load of the lost-motion spring 35 is represented by a formula ①. In the formula ①, F0 denotes a set load (N), and K denotes a spring constant (N/m).

$$F = F0 + K \times S \qquad \text{Formula ①}$$

For example, when the set load F0 is equal to 52N and the spring constant K is equal to 12300 N/m, the spring load F is equal to 175 N because the displacement amount S is equal to 0.010 m as mentioned above.

In such a system configuration, when the engine rotational speed is relatively low, an inertial force applied to the equivalent inertia weight Ms is sufficiently small as compared with the spring load F. Hence, as shown by a solid line of the upper graph of FIG. 10, the lost motion is done with a substantially theoretical lift characteristic. An acceleration characteristic of the displacement S which corresponds to this solid line is shown by the lower graph of FIG. 10. That is, a positive acceleration (denoted by +) occurs at the time of an initial rising of the lift. Then, a negative acceleration (denoted by −) occurs because the displacement S decelerates after the initial rising of the lift. Then, the lift amount is decreased. Then, a positive acceleration (denoted by +) occurs again at the time of a last falling of the lift toward zero. Then, the one lift action is finished.

It is noted that a slight acceleration occurs at the time of beginning of the initial rising of the lift in order to generate a slight ramp speed. Also, a slight acceleration occurs at the time of end of the last falling of the lift in order to eliminate a slight ramp speed.

On the other hand, when the operating state of the engine is in a very-high-speed region, a jumping phenomenon is caused as shown by a dotted line of the upper graph of FIG. 10. This is because a negative inertial force applied to the equivalent inertia weight Ms by the above-mentioned negative acceleration is large due to the very high speed of the engine. This negative inertial force is fully greater than the spring load F of the lost-motion spring 35, so that the lost-motion spring 35 becomes unable to properly support the equivalent inertia weight Ms.

A maximum negative inertial force FI is represented by a formula ②.

$$FI = Ms \times |S''\text{Max}| \times (\pi N/60)^2 \qquad \text{Formula ②}$$

In the formula ②, N denotes the number of revolutions (rotations) per minute (60 seconds), and has a unit of "rpm". An angular speed of the engine is represented by $2\pi N/60$. Hence, an angular speed of the drive cam (drive shaft) is represented by $\pi N/60$ (unit: rad/sec) which is a half of $2\pi N/60$. A maximum negative acceleration |S" Max| which causes the lost-motion displacement amount S to become equal to 0.010 m is near 0.025 m/rad² in the case of the first embodiment.

If the revolution number N is, for example, equal to 3000 rpm, the maximum negative inertial force FI is about equal to 25 N. This maximum negative inertial force FI is sufficiently smaller than the spring load F (=175 N), so that the theoretical lift curve shown by the solid line of the upper graph of FIG. 10 is realized.

Moreover, if the revolution number N is equal to 9000 rpm which is a very high speed, the maximum negative inertial force FI is about equal to 220 N. This maximum negative inertial force FI is greater than the spring load F (=175 N). Accordingly, an abnormal behavior with the above-mentioned jumping occurs as shown by the dotted line of the upper graph of FIG. 10.

A level of the engine revolution number (rotational speed) at which such an abnormal behavior starts to be caused will now be considered. It is conceivable that the separation between the components stars to occur when the negative inertial force FI becomes equal to the spring load F of the lost-motion spring 35. That is, when the engine revolution number takes a minimum value necessary to allow the negative inertial force FI to reach the spring load F, the separation starts to be caused.

This engine revolution number which starts to cause the separation is referred to as a simply-calculated limit revolution number Nt (rpm). The simply-calculated limit revolution number Nt can be simply calculated by a formula ③.

$$Nt = (\pi N/60) \times \sqrt{\{F/(Ms \times |S''\text{Max}|)\}} \qquad \text{Formula ③}$$

In the formula ③, √{ } denotes a square root of { }.

For example, as mentioned above, the equivalent inertia weight Ms is equal to 0.040 kg, the lost-motion (peak) displacement amount S is equal to 0.010 m (=S3), and the maximum negative acceleration |S" Max| is equal to 0.025 m/rad². Moreover, the spring load F is equal to 175 N because the set load F0 is equal to 52N, the spring constant K is equal to 12300 N/m, and the lost-motion (peak) displacement amount S is equal to 0.010 m.

As a calculation result of the formula ③ under the above condition, the simply-calculated limit revolution number Nt is equal to 8000 rpm.

Figure 11:
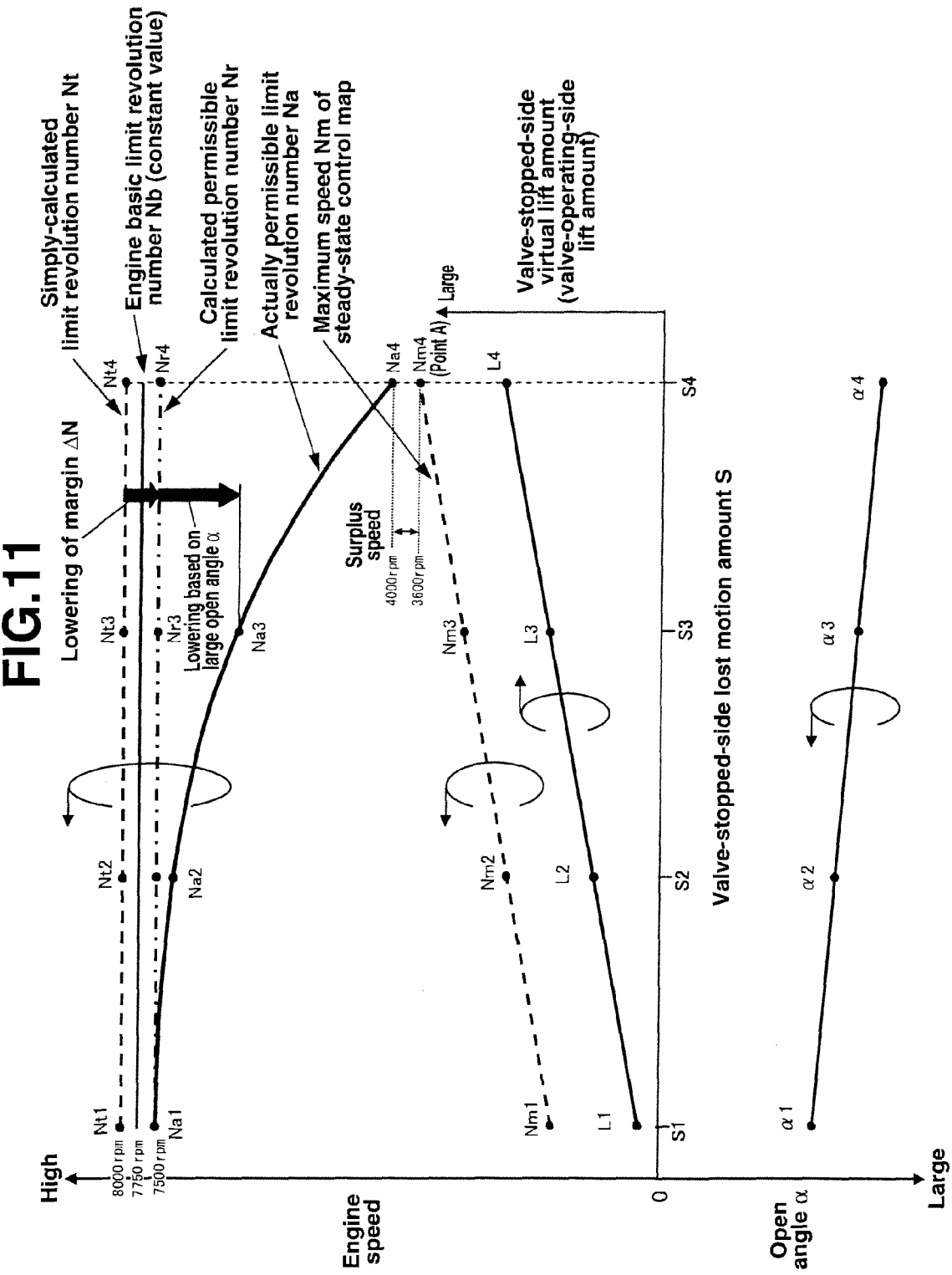
FIG. 11 is a characteristic view based on a displacement amount of the lost motion of the valve stop mechanism in the first embodiment.

FIG. 11 shows a relation between the lost-motion (peak) displacement amount S and the simply-calculated limit revolution number Nt. As shown in FIG. 11, the simply-calculated limit revolution number Nt is equal to Nt3 when the lost-motion displacement amount S is equal to S3.

This simply-calculated limit revolution number Nt is not varied much even if the lost-motion displacement amount S varies. This is because the spring load F increases when the lost-motion displacement amount S increases. That is, when the lost-motion displacement amount S increases, the maximum negative acceleration |S" Max| is increased to enlarge the negative inertial force. However, at the same time, also the spring load F is increased. As a result, the simply-calculated limit revolution number Nt is less varied, as represented by the formula ③. Accordingly, the relation between the lost-motion displacement amount S and the simply-calculated limit revolution number Nt has a characteristic in which the simply-calculated limit revolution number Nt always takes an approximately-constant level (i.e., takes a substantially-changeless level), as shown by a dotted line of FIG. 11.

A permissible limit revolution number Nr (rpm) is generally lower than the simply-calculated limit revolution number Nt (rpm), for the following reason. The valve system constituted by the swing arm, the swing cam and the like is deformed and thereby vibrated because a rigidity Kd of the valve system is not infinite (∞), when the spring load of the lost-motion spring 35 comes to have a very small margin load relative to the negative inertial force. Thereby, the separation between the components is caused.

In more detail, by setting a margin ΔN (rpm), the calculated permissible limit revolution number Nr (rpm) is given by a formula ④. This margin ΔN (rpm) is set also in consideration of a motion-characteristic worsening caused due to a dispersion (variation) of spring characteristic of the lost-motion spring 35 or the like, and contrarily in consideration of a motion-characteristic improvement produced by an attenuation coefficient C of respective sliding portions of the valve system.

$$Nr = Nt - \Delta N \quad \text{Formula ④}$$

In a case of normal valve system, the margin ΔN is set as several hundreds of revolutions per minute (rpm). In the first embodiment, assuming that the margin ΔN is equal to 500 rpm, the permissible limit revolution number Nr3 is calculated as 7500 rpm. Nr3=Nt3−500=7500 rpm A characteristic of the calculated permissible limit revolution number Nr in the case that the lost-motion displacement amount S has varied is shown by an alternate-long-and-short dash line of FIG. 11. The calculated permissible limit revolution number Nr does not vary much even if the lost-motion displacement amount S varies and has a characteristic of a substantially constant level, in the same manner as the simply-calculated limit revolution number Nt.

Next, an actually permissible limit revolution number Na in a case that the above-mentioned open angle α (which is a particularity of the valve stop mechanism 11 in the first embodiment) has varied will now be considered.

As mentioned above, the lateral deviation and the detachment of the first swing arm 6 from the tip head portion 27b of the hydraulic lash adjuster 10a are caused more easily as the open angle α becomes larger (i.e., as the displacement amount S becomes larger) and/or as the rotational speed of the engine becomes higher. Therefore, the actually permissible limit revolution number Na needs to be made smaller as the displacement amount S becomes larger.

In the lost motion when the (peak) displacement amount S takes the value S3 (=0.010 m), the actually permissible limit revolution number Na3 needs to be given by lowering the calculated permissible limit revolution number Nr (=7500 rpm), for example, by about 1200 rpm. That is, the actually permissible limit revolution number Na3 is equal to 6300 rpm (i.e., 7500 rpm−1200 rpm=6300 rpm), as shown by a long downward-arrow of FIG. 11.

When the open angle α is further enlarged, the attitude of the first swing arm 6 is further worsened. Hence, the actually permissible limit revolution number Na needs to be reduced more rapidly. For example, when the (peak) displacement amount S has increased up to S4 such that the open angle α has been increased up to α4, the actually permissible limit revolution number Na4 needs to be given by lowering the calculated permissible limit revolution number Nr (=7500 rpm) by about 3500 rpm. That is, the actually permissible limit revolution number Na4 is equal to 4000 rpm (i.e., 7500 rpm−3500 rpm=4000 rpm). Accordingly, the open angle α varies from α1 to α4 when the lost-motion displacement amount S which is a horizontal axis of the graph varies from S1 to S4. As shown by a thick solid line of FIG. 11, the actually permissible limit revolution number Na has an upwardly-convex-shaped characteristic in which the actually permissible limit revolution number Na varies from the 7500 rpm to 4000 rpm.

A virtual lift amount shown in FIG. 11 represents a lift amount of the first intake valve 3 which would be obtained if the state of the first intake valve 3 were promptly changed from the valve-stopped state (the lost-motion state) into the valve-operating state. In other words, the virtual lift amount shown in FIG. 11 represents the lift amount of the second intake valve 3 which is constantly in the valve-operating state.

As mentioned above, the actually permissible limit revolution number Na is varied according to the lost-motion displacement amount S, as shown by the thick solid line of FIG. 11. Therefore, even when the lost-motion displacement amount S takes any values, the lateral deviation of the first swing arm 6 from the tip head portion 27b of the hydraulic lash adjuster 10a can be prevented. Also, the abnormal behavior such as a partial wear of each contact portion of the first swing arm 6 and the detachment of the first swing arm 6 which are caused due to this lateral deviation can be prevented.

An engine basic limit revolution number Nb shown in FIG. 11 is a normal permissible limit speed of the engine when the state of the first intake valve 3 is not in the valve-stopped state (i.e., not in the lost-motion state). The engine basic limit revolution number Nb has a constant value, for example, equal to 7750 rpm.

This engine basic limit revolution number Nb is given based on various factors such as a permissible speed of a valve control apparatus for exhaust valve and a permissible speed determined by a seizure limit of the piston. The engine basic limit revolution number Nb is an intrinsic permissible speed which is determined by an individual engine itself.

That is, the engine basic limit revolution number Nb is used as an actual speed limit Nl of the engine (which is actually set for the engine control) when every engine valve is not in the valve-stopped state. On the other hand, the actually permissible limit revolution number Na is used as the actual speed limit Nl when a part of the engine valves is in the valve-stopped state (lost-motion state). This actually permissible limit revolution number Na is influenced by the lost-motion displacement amount S as mentioned above.

Figure 12:
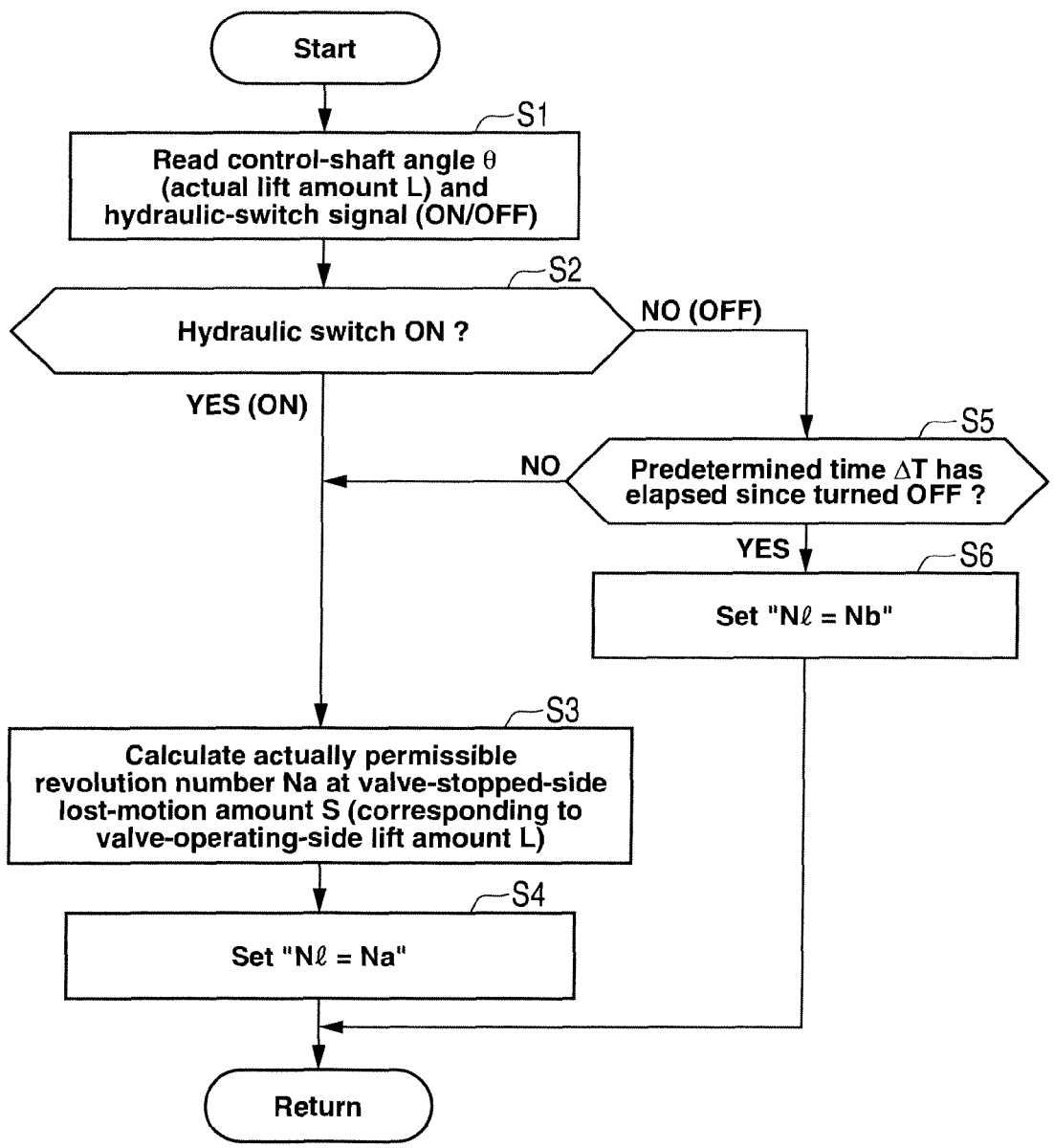
FIG. 12 is a flowchart in which a speed limit of an engine-rotational-speed limiting circuit is set in the first embodiment.

FIG. 12 is a control flowchart that sets the actual speed limit Nl of the engine speed (revolution number).

At first, at step S1, the rotation angle θ of the control shaft 21 is detected by the controller (the control unit 53). Then, the (actual) lift amount L corresponding to the detected rotation angle θ is calculated. Then, the controller reads the signal outputted from the hydraulic switch 48.

At step S2, the controller judges whether the output signal of the hydraulic switch 48 is ON signal or OFF signal.

If the controller determines that the output signal of the hydraulic switch 48 is the ON signal, the program proceeds to step S3. Because the controller determines that the first intake valve 3 is in the valve-stopped state (in the lost-motion state), the controller calculates the actually permissible limit revolution number Na with reference to the characteristic view or table as shown in FIG. 11, at step S3. Specifically, the actual lift amount L of the second intake valve 3 (which is in the valve-operating state) is calculated from the rotation angle θ of the control shaft 21. Then, the lost-motion displacement amount S of the first intake valve 3 (which is in the valve-stopped state) is calculated based on the virtual lift amount equal to the lift amount L. Then, the actually permissible limit revolution number Na corresponding to the lost-motion displacement amount S is obtained from the characteristic view or table as shown in FIG. 11.

At step S4, the actually permissible limit revolution number Na is set as the speed limit Nl.

If the controller determines that the output signal of the hydraulic switch 48 is the OFF signal at step S2, the program proceeds to step S5. At step S5, the controller judges whether or not a predetermined time period ΔT has elapsed since the hydraulic switch 48 turned from ON to OFF. If the controller determines that the predetermined time period ΔT has not yet elapsed, the program proceeds to step S3 because there is a possibility that the first intake valve 3 is still in the valve-stopped state. If the controller determines that the predetermined time period ΔT has already elapsed at step S5, the program proceeds to step S6.

At step S6, the controller determines that the first intake valve 3 is in the valve-operating state. Hence, the engine basic limit revolution number Nb is set as the speed limit Nl.

The process of step S5 is done because there is a possibility that the first intake valve 3 is still in the valve-stopped state due to a rising delay to peak hydraulic pressure and an operation delay of the valve stop mechanism 11. Because the actually permissible limit revolution number Na is always lower than the engine basic limit revolution number Nb (Na<Nb), the actually permissible limit revolution number Na is set as the speed limit Nl for the sake of safety. It is noted that the predetermined time period ΔT is set in a range from 0.1 seconds to 0.5 seconds, for example.

Figure 13:
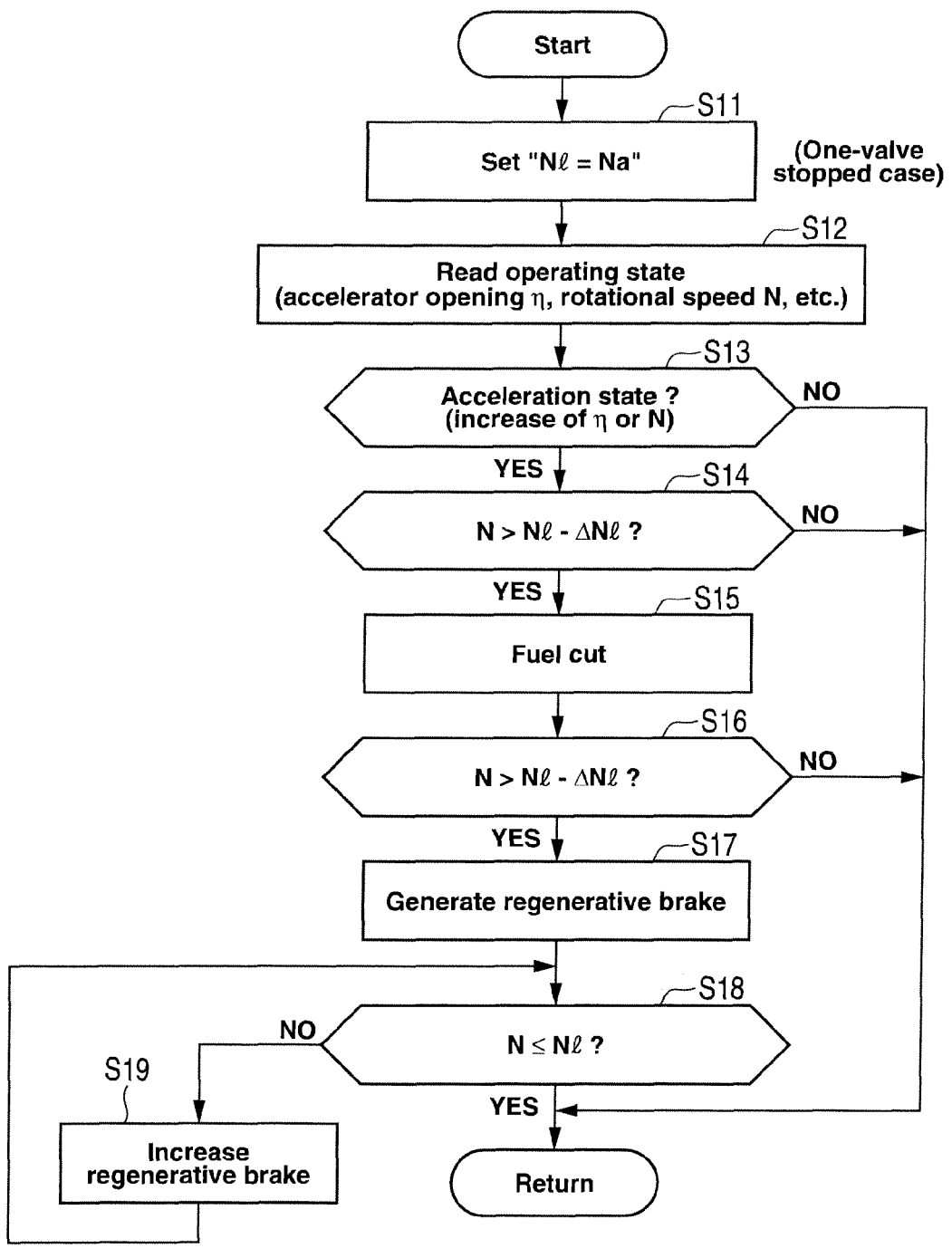
FIG. 13 is a control flowchart which is executed by the engine-rotational-speed limiting circuit in the first embodiment.

FIG. 13 is a speed-limit control flowchart which actually controls the engine speed with the speed limit Nl. A substantive control of the flowchart of FIG. 13 starts for example when the actually permissible limit revolution number Na is set as the speed limit Nl at step S4 of FIG. 12. At step S11 of FIG. 13, the controller uses the actually permissible limit revolution number Na as the speed limit Nl (Nl=Na) by recognizing that the first intake valve 3 (one-side valve) is in the valve-stopped state. That is, step S11 of FIG. 13 accords with step S4 of FIG. 12.

Figure 14:
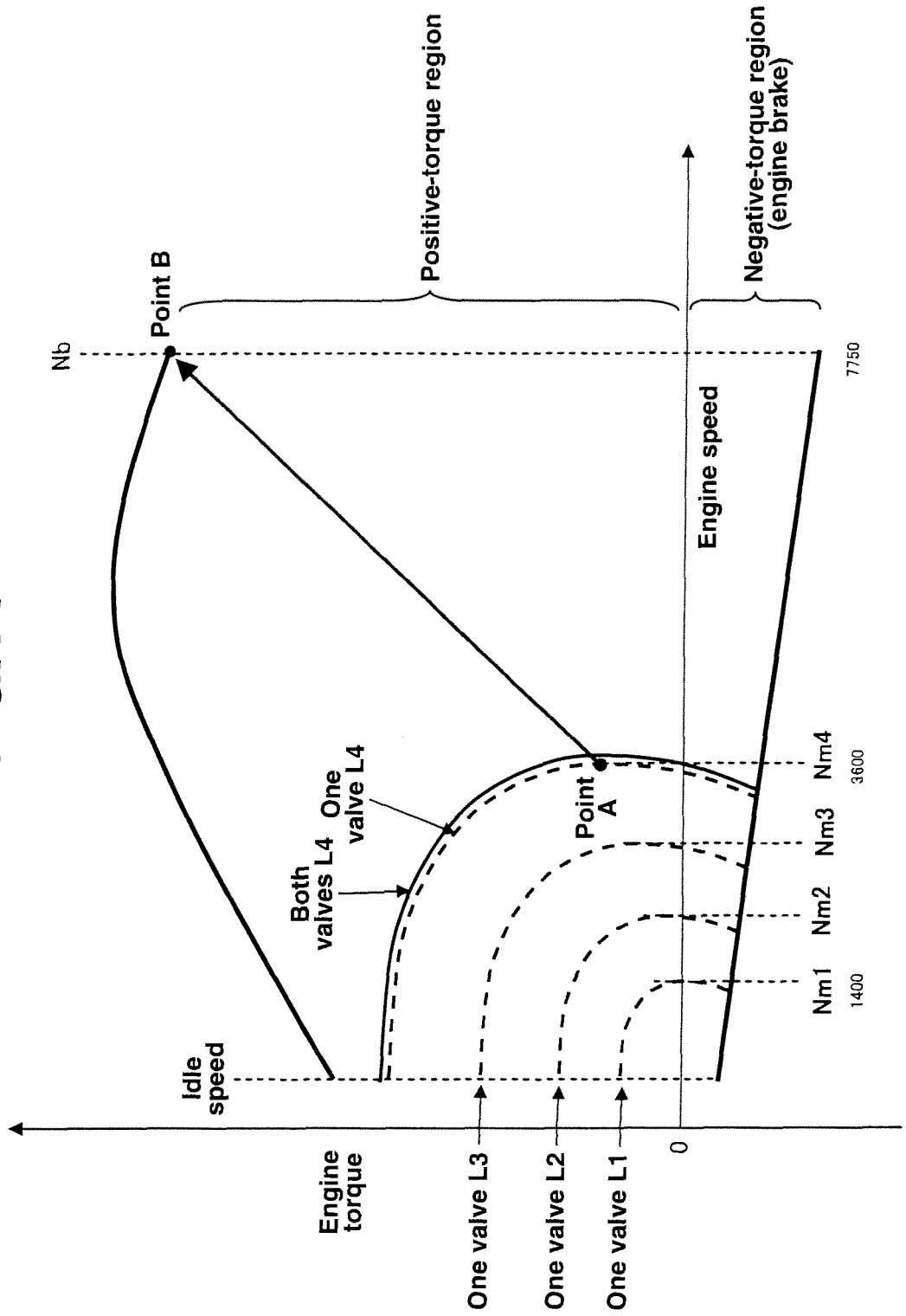
FIG. 14 is a view showing a steady-state control map for the lift amount of the intake valve in the first embodiment.

FIG. 14 shows a control map for a steady driving state. For example, the vehicle is in the state of a driving point A of FIG. 14 (one-side-valve lost-motion amount S4, another-side-valve lift amount L4) at the time of process of step S11 of FIG. 13. In this driving point A, the engine rotational speed is equal to Nm4. On the control map for the steady driving state, Nm4 is the highest speed value in a range of the lost-motion amount S4. Since the speed value Nm4 is lower than the actually permissible limit revolution number Na4 (=Nl), there is no problem. That is, the above-mentioned irregular behavior is not caused as long as the steady driving.

However, when an accelerator opening η and/or the engine rotational speed N rapidly increases because of sudden acceleration, there is a risk that the engine rotational speed N transiently exceeds the speed limit Nl under the lost-motion state. This problem is avoided by the speed-limit control flowchart of FIG. 13.

At step S12 of FIG. 13, the controller reads a current operating state such as the accelerator opening η and the engine rotational speed N.

Next, at step S13, the controller judges whether or not the vehicle is in an acceleration state (i.e., is now accelerating) by detecting an increase of the accelerator opening η and/or an increase of the engine rotational speed N. If it is determined that the vehicle is not in the acceleration state at step S13, the program is returned. If it is determined that the vehicle is in the acceleration state at step S13, the program proceeds to step S14.

At step S14, the controller judges whether or not the engine rotational speed N is higher than a value (Nl−ΔNl) obtained by subtracting a predetermined value ΔNl from the speed limit Nl. This predetermined value ΔNl is a small speed value, for example, equal to 100 rpm. If the controller determines that the engine rotational speed N is not higher than the value (Nl−ΔNl), the program is returned. If the controller determines that the engine rotational speed N is higher than the value (Nl−ΔNl), the program proceeds to step S15. That is, in the case that a relation N>Nl−ΔNl is satisfied, there is a risk that the engine rotational speed N exceeds the speed limit Nl if remain uncontrolled.

Therefore, at step S15, the controller performs a fuel cut control such that a generation of combustion torque is stopped. That is, the engine rotational speed N is restricted by the fuel cut. It is noted that this fuel cut may be replaced by a reduction in fuel injection amount. In this case, the engine rotational speed N can be limited to some extent.

At step S16, the controller again judges whether or not the engine rotational speed N is higher than the value (Nl−ΔNl). If the engine rotational speed N is not higher than the value (Nl−ΔNl), the program is returned. If the engine rotational speed N is higher than the value (Nl−ΔNl), the controller determines that the restriction of the engine rotational speed N is insufficient. Then, the program proceeds to S17.

At step S17, the controller generates a regenerative brake so that a braking is certainly applied to the engine rotational speed N. This is because the engine rotational speed N is difficult to reduce, for example, on a downhill road and the like.

At step S18, the controller judges whether or not the engine rotational speed N is lower than or equal to the speed limit Nl (=the actually permissible limit revolution number Na). If YES at step S18, i.e. if the controller determines that the engine rotational speed N is lower than or equal to the speed limit Nl, the program is returned.

If NO at step S18, i.e. if the controller determines that the engine rotational speed N is higher than the speed limit Nl, the program proceeds to step S19. At step S19, the controller increases the regenerative brake. Then, at step S18, the controller again judges whether or not the engine rotational speed N is lower than or equal to the speed limit Nl (=the actually permissible limit revolution number Na).

By so doing, this increase cycle of the regenerative brake is repeated as needed. Thus, the engine rotational speed N can be restricted to a range lower than the speed limit Nl.

Normally, the engine rotational speed N can be sufficiently restricted only by the fuel cut. However, in the case of steep downhill road, such a regenerative brake is effective. Moreover, by using a friction brake in combination, the restriction of the engine rotational speed N can be further hastened.

On the other hand, even in the case of steep downhill road, the restriction of the engine rotational speed N can be promptly done only by the fuel cut without using the brake, by separating the engine from a wheel-driving system.

FIG. 13 shows the flowchart in which the actually permissible limit revolution number Na is set as the speed limit Nl (Nl=Na) under the one-valve-stopped state. However, if the one-valve-stopped state changes into the both-valve-operating state during execution of this flowchart, the both-valve operation is recognized based on the flowchart of FIG. 12. Thereby, the engine basic limit revolution number Nb is set as the speed limit Nl (Nl=Nb) at step S6 of FIG. 12. Then, the engine rotational speed N is restricted to the range lower than the speed limit Nl in the same manner as the flowchart of FIG. 13. That is, also in the case of both-valve-operating state, the engine rotational speed N can be limited to the range lower than the speed limit Nl, only by rewriting step S11 of FIG. 13 as Nl=Nb.

FIG. 13 shows the example in which the vehicle is accelerated toward the engine basic limit revolution number Nb (Point B) from a steady-state maximum speed Nm4 (Point A of FIG. 11) under the one-valve-stopped state (lost-motion displacement amount S4) having the one-valve lift amount L4. However, as a matter of course, the vehicle may be accelerated from the other one-valve lift amounts. Maximum rotational speeds Nm1 to Nm4 on the steady-state map are small respectively (in the entire region) as compared with the actually permissible limit revolution numbers Na1 to Na4. Hence, the vehicle in the steady state has a margin against the above-mentioned abnormal behavior. Therefore, the abnormal behavior can be prevented from occurring during the lost motion.

In a case that the vehicle is accelerated from any of the maximum rotational speeds Nm1 to Nm3 of FIG. 11, the risk that the abnormal behavior occurs due to over revving is small as compared with the case that the vehicle is accelerated from the maximum rotational speeds Nm4. This is because a margin (surplus) between the maximum rotational speed Nm1-Nm3 and the actually permissible limit revolution number Na1-Na3 is larger than the margin between the maximum rotational speed Nm4 and the actually permissible limit revolution number Na4.

The above-mentioned regenerative brake in FIG. 13 can be easily realized, for example, by an alternator motor which rotates synchronously through the crankshaft, belt and the like.

That is, the alternator motor can produce electricity by a motor rotative force generated by the crankshaft. At this time, the regenerative brake arises. A production amount of electricity is enlarged by controlling an inverter provided for the alternator motor, when the regenerative brake needs to be applied at steps S17 and S19 of FIG. 13. As a merit of such a regenerative brake, a battery can be charged by the electricity production. Hence, charged energy can be used as an energy for the other scenes such as an engine start and a vehicle drive. As a result, total fuel consumption of the vehicle can be saved.

As the other braking means, normal friction brakes for road-wheels can be cited. However, hydraulic energy is necessary to generate a braking force of the normal friction brake. Moreover, at this time, an energy loss is generated due to friction. Hence, this means worsens the fuel consumption of the vehicle.

Supplemental explanations for FIG. 14 are as follows. FIG. 14 is the lift-amount control map under the steady driving state in the first embodiment according to the present invention. Dotted lines of FIG. 14 show a lift-amount map of the operating-side intake valve (second intake valve) in the one-valve-stopped state. A solid line of FIG. 14 shows a lift-amount map of each of the first and second intake valves in the both-valve-operating state.

A region smaller in engine speed and torque than or equal to the dotted line denoted by "one valve L1" of FIG. 14 is controlled (i.e. is realized) by one valve with the lift amount L1. The dotted line denoted by "one valve L2" of FIG. 14 is controlled by one valve with the lift amount L2. A region between the dotted line denoted by "one valve L1" and the dotted line denoted by "one valve L2" of FIG. 14 is controlled by one valve with values continuously varied from the lift amount L1 to the lift amount L2. The dotted line denoted by "one valve L3" of FIG. 14 is controlled by one valve with the lift amount L3. A region between the dotted line denoted by "one valve L2" and the dotted line denoted by "one valve L3" of FIG. 14 is controlled by one valve with values continuously varied from the lift amount L2 to the lift amount L3. The dotted line denoted by "one valve L4" of FIG. 14 is controlled by one valve with the lift amount L4. A region between the dotted line denoted by "one valve L3" and the dotted line denoted by "one valve L4" of FIG. 14 is controlled by one valve with values continuously varied from the lift amount L3 to the lift amount L4.

That is, in a region which has relatively low engine torque and low engine speed, the fuel economy is important. Hence, the combustion is improved by gas flow of the one-valve operation of the intake valves 3. Moreover, according to the increase of the engine torque and speed, the lift amount of the operating valve is enlarged while maintaining a large throttle opening. Thereby, output power is enlarged while suppressing a pumping loss. That is, the fuel economy is improved by these combustion improvement and pumping-loss suppression.

The solid line denoted by "both valves L4" of FIG. 14 is slightly larger in engine speed and torque than the dotted line denoted by "one valve L4". In a region larger in engine speed and torque than the solid line denoted by "both valves L4", both of the intake valves 3 operate constantly with the large lift amount L4. That is, a sufficient torque is produced by the large lift and the both-valve operation.

It is noted that another lift-amount control map may be additionally provided for, for example, a start time of the engine and a relatively cold state of the engine. Moreover, it is noted that, for example, the region between the lift amount L1 and the lift amount L2 in FIG. 14 may be realized by the both-valve operation in place of the one-valve stop. In this case, the intake-air charging efficiency (torque) is enhanced to improve a drivability.

Second Embodiment

Figure 15:
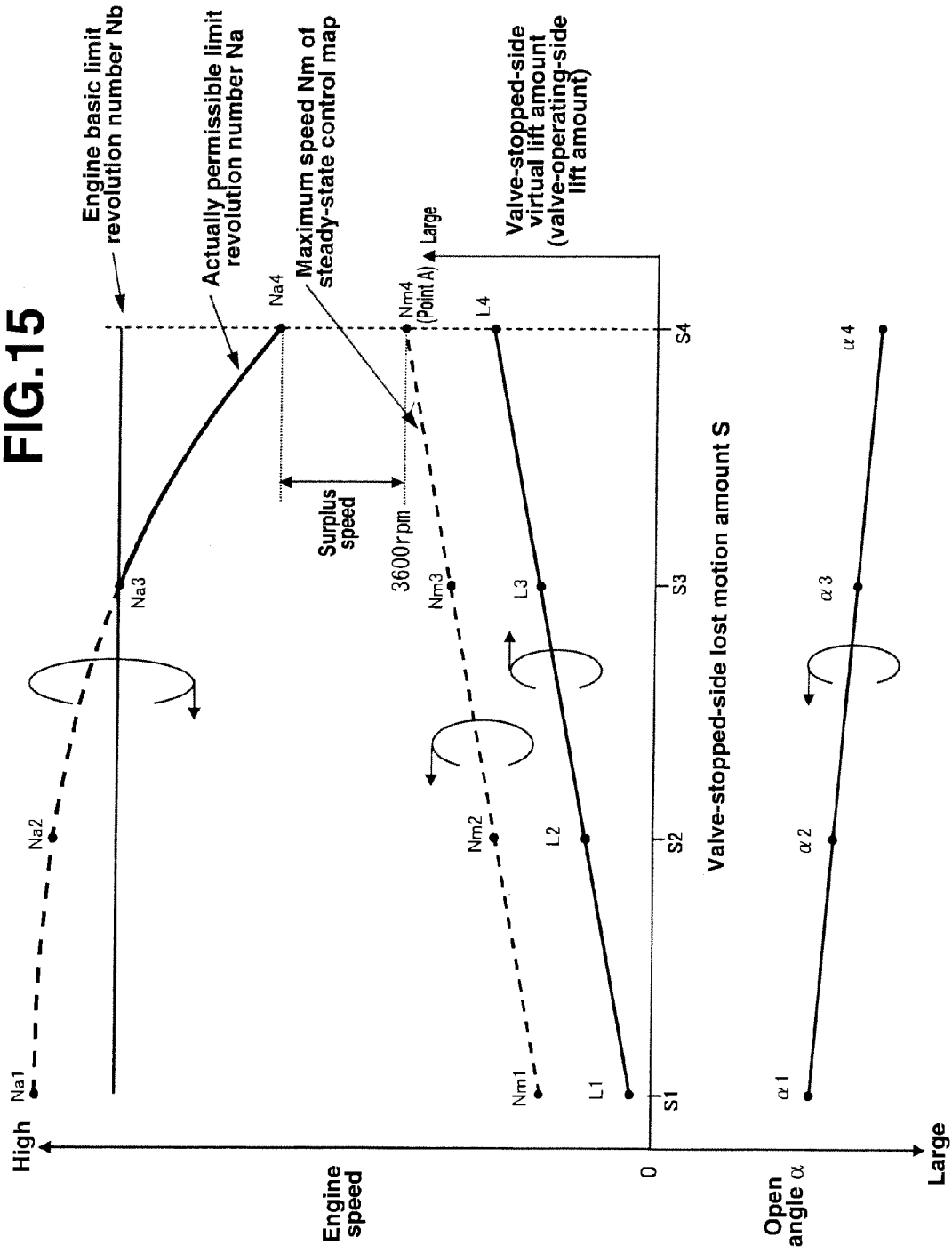
FIG. 15 is a characteristic view based on the displacement amount of the lost motion of the valve stop mechanism in a second embodiment according to the present invention.

FIG. 15 shows characteristics that are obtained by the lost-motion displacement amount S of the valve stop mechanism 11 in a second embodiment according to the present invention.

In the second embodiment, the configuration is designed such that the "F0" and "K" of the above-mentioned formula ① are enlarged. As a result, the actually permissible limit revolution number Na becomes higher over the entire region of the lost-motion displacement amount S, as compared with that of the first embodiment. Therefore, the margin (difference) between the maximum speed Nm and the actually permissible limit revolution number Na on the steady-state map is increased. In particular, although the margin (Na4−Nm4) between the maximum speed Nm4 and the actually permissible limit revolution number Na4 in the state of lost-motion amount S4 (L4) is smallest in the entire region of the lost-motion displacement amount, this margin (Na4−Nm4) is increased in the second embodiment.

By virtue of increase of this margin, the risk that the lost-motion irregular behavior (abnormal behavior) occurs due to transient overrun (i.e., exceeding the actually permissible limit revolution number Na under the one-valve stopped state) caused in process of the lost motion is reduced.

As shown in FIG. 15, the actually permissible limit revolution number Na3 at the time of lost-motion amount S3 is approximately equal to the engine basic limit revolution number Nb. Hence, when the lost-motion displacement amount S takes any value between S1 and S3, the speed limit Nl is not set to be equal to the actually permissible limit revolution number Na, but is set to be equal to the engine basic limit revolution number Nb. Therefore, the over-revving (overrunning) of the engine which exceeds the engine basic limit revolution number Nb can be avoided, so that also a failure of the engine itself such as a seizure can be avoided.

Third Embodiment

Figure 16:
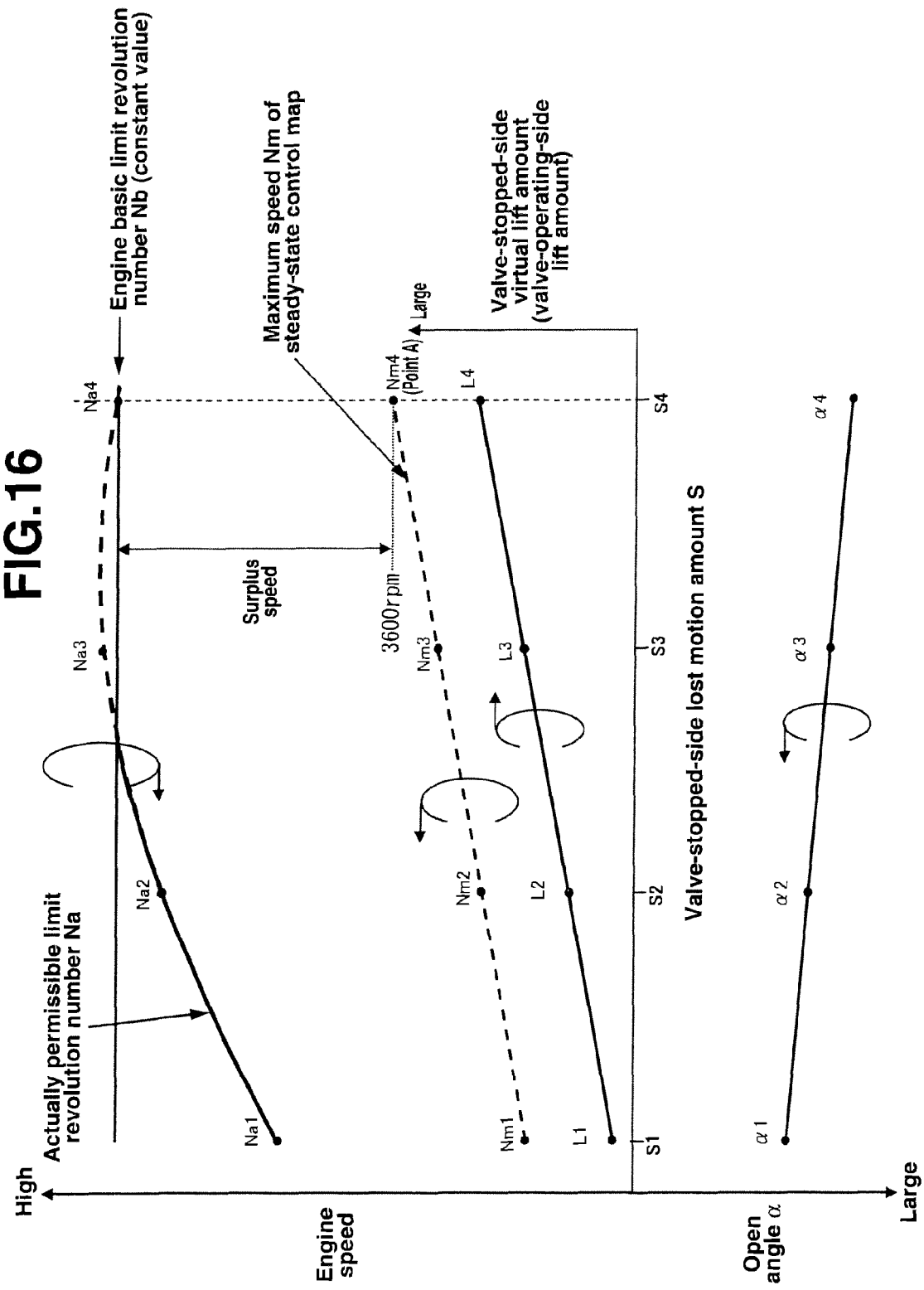
FIG. 16 is a characteristic view based on the displacement amount of the lost motion of the valve stop mechanism in a third embodiment according to the present invention.

FIG. 16 shows characteristics that are obtained by the lost-motion displacement amount S of the valve stop mechanism 11 in a third embodiment according to the present invention.

In the third embodiment, the configuration is designed to reduce the "F0" of the above-mentioned formula ① as compared with the first embodiment and to enlarge "K" of the formula ① as compared with the second embodiment. Accordingly, the actually permissible limit revolution number Na is relatively low in a region in which the lost-motion displacement S is small, whereas the actually permissible limit revolution number Na is relatively high in a region in which the lost-motion displacement S is large. That is, as compared with the first and second embodiments, the actually permissible limit revolution number Na is more reduced as the lost-motion displacement S becomes smaller whereas the actually permissible limit revolution number Na is more enlarged as the lost-motion displacement S becomes larger. As a result, as shown in FIG. 16, the actually permissible limit revolution number Na has a diagonally-right-up characteristic shaped like an upward convex.

Accordingly, the actually permissible limit revolution numbers Na1 and Na2 at the lost-motion displacements S1 and S2 become low. That is, in a regular low-load region which is realized by one intake valve with the lift amount L1 to L2, the spring load of the lost-motion spring 35 is relatively small, so that a frictional loss caused by the lost motion is reduced to improve the fuel economy.

As shown in FIG. 16, the actually permissible limit revolution number Na reaches the engine basic limit revolution number Nb at a point between the lost-motion displacement S2 and the lost-motion displacement S3. Then, the actually permissible limit revolution number Na continues to rise until a point located just after the lost-motion displacement S3. Then, the actually permissible limit revolution number Na somewhat decreases until the lost-motion displacement S4. The actually permissible limit revolution number Na4 at the lost-motion displacement S4 is substantially equal to the engine basic limit revolution number Nb.

Therefore, the margin (Na4−Nm4) between the maximum speed Nm4 and the actually permissible limit revolution number Na4 at the lost-motion displacement S4 is sufficiently large. Accordingly, the lost-motion irregular behavior is more reliably prevented from occurring due to the transient overrun (i.e., exceeding the actually permissible limit revolution number Na under the one-valve stopped state) caused in process of the lost motion.

Fourth Embodiment

Figure 17:
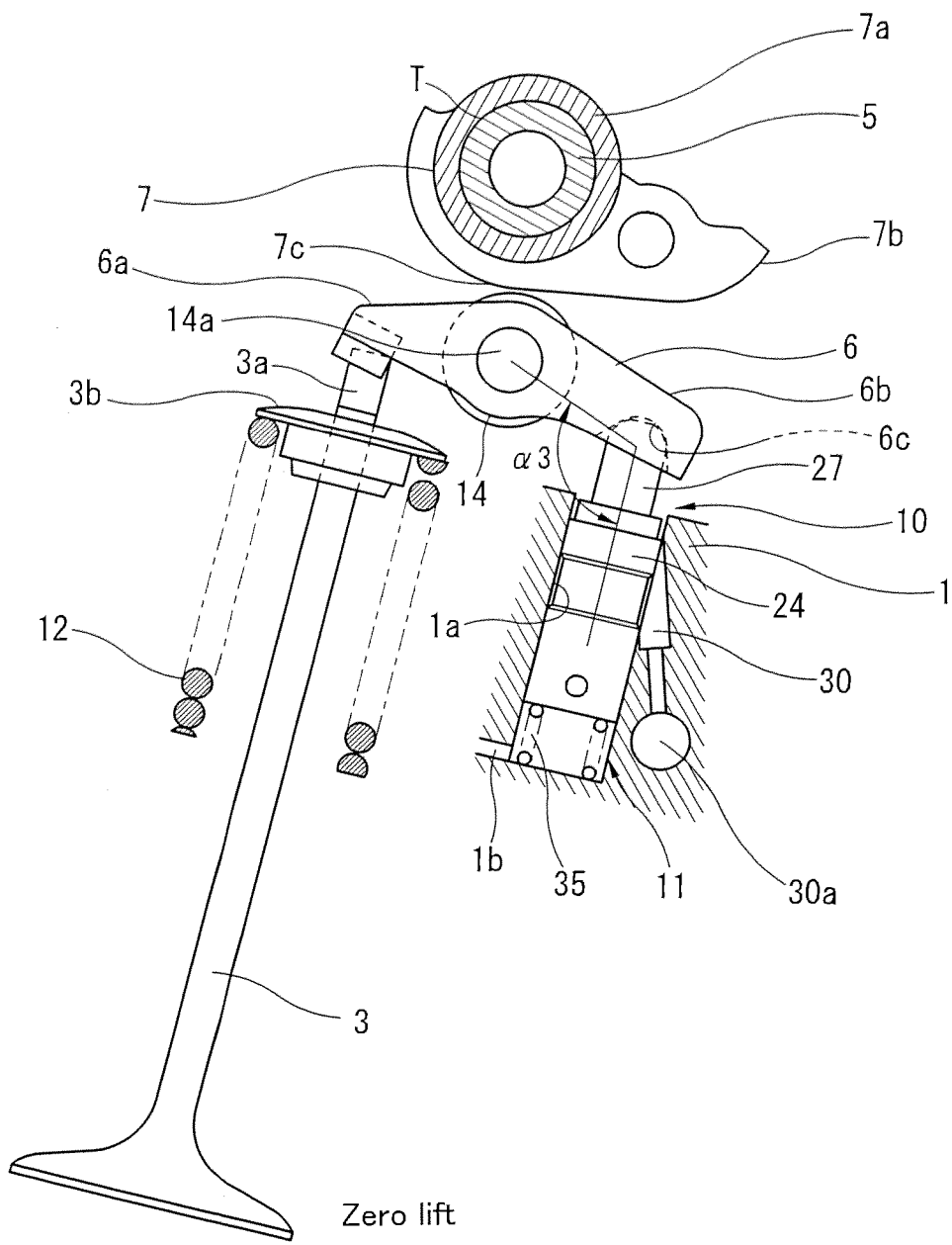
FIG. 17 is a view for explaining operations of the first hydraulic lash adjuster and the valve stop mechanism at the time of valve-closed state of the first intake valve in a case that the lift amount of the second intake valve is equal to L3 in a fourth embodiment according to the present invention.

FIG. 17 shows a fourth embodiment according to the present invention. A basic configuration of the fourth embodiment is the same as the first embodiment. In the fourth embodiment, whole the variable lift mechanism including the swing cams 7 is arranged in a direction opposite to those of the first to third embodiments (i.e., mirror arrangement).

The swing cam 7 swings in the clockwise direction of FIG. 17, and thereby, the swing arm 6 and the intake valve 3 are lifted and opened.

In the fourth embodiment, a swinging lift direction of the swing cam 7 is the same as the lost-motion direction of the first hydraulic lash adjuster 10a. Hence, as compared with the structure shown in FIG. 9 of the first embodiment, it is difficult for the cam nose portion of the swing arm 7 to interfere with the swing arm 6 during operation.

Moreover, in the fourth embodiment, the contact portion between the swing cam 7 and the roller 14 of the swing arm 6 approaches the first hydraulic lash adjuster 10a such that the swing cam 7 presses an approximately center of the swing arm 6. Hence, a contact condition between the first hydraulic lash adjuster 10a and the swing arm 6 is favorable to improve the phenomenon of the lateral deviation therebetween. Therefore, the actually permissible limit revolution number Na for the lost motion can be set as a higher value.

INDUSTRIAL APPLICABILITY

In the above respective embodiments, the valve stop mechanism 11 is provided to the hydraulic lash adjuster which functions as the fulcrum for the swing arm 6. This hydraulic lash adjuster is made to slide directly in the retaining hole 1a of the cylinder head 1. However, according to the present invention, a collar made of iron-based material may be interposed in the retaining hole is such that the hydraulic lash slides in the collar. In this case, a wear resistance can be enhanced even if the cylinder head 1 is made of aluminum or magnesium-based material.

Moreover, in the above respective embodiments, the variable lift mechanism is combined with the so-called one-valve stop mechanism which stops one of two intake valves by the lost motion. Under this structure, the maximum rotational speed of the engine is limited according to the lost-motion amount of the one of two intake valves. However, examples according to the present invention are not limited to such a structure.

For example, the above-mentioned Japanese Patent Application Publication No. 2007-100585 discloses a so-called cylinder resting mechanism (variable cylinder mechanism) which stops both of two intake valves (and/or both of two exhaust valves) of at least one of cylinders (i.e., rests a specific cylinder) by the lost motion and which operates both of two intake valves (and/or both of two exhaust valves) of the remaining cylinders in accordance with an operating condition. The example according to the present invention can be applied also to a combination of this cylinder resting mechanism and the variable lift mechanism.

In this case, the effects similar to the above embodiments can be obtained, for example, by limiting the maximum rotational speed of the engine in accordance with the lost-motion displacement amounts of the two intake valves (and/or the two exhaust valves) of the specific at least one cylinder. Moreover, in this case, in a region in which both of the intake valves and exhaust valves are in the lost motion, both of irregular behaviors of the intake and exhaust valves which are caused due to the lost motions can be avoided by limiting the maximum rotational speed of the engine on the basis of a lower one of the actually permissible limit revolution numbers N set for the intake and exhaust valves.

Moreover, in the above respective embodiments, the lift amount of the intake valve is continuously varied by the variable lift mechanism. However, the variable lift mechanism may change the lift amount of the intake valve in a stepwise manner. For example, in the first embodiment, the variable lift mechanism may change the rotation angle θ of the control shaft 21 in the stepwise manner between an angle position (maximum lift amount) at which the control shaft 21 has rotated at a maximum in a lift-increasing direction and an angle position (minimum lift amount) at which the control shaft 21 has rotated at a maximum in a lift-reducing direction.

Moreover, the present invention is applicable to various types of the variable lift mechanisms. That is, a principle for the variable lift mechanism is not limited to the variation of the attitude of the swing cam 7. Instead, a type (e.g., US Patent Application Publication No. 2011/0180027) in which a cam for downwardly pushing the swing arm is selected from a small-lift cam and a large-lift cam by moving the both cams in the axial direction during a working of base-circle regions of the both cams may be employed.

Moreover, in the above respective embodiments, the valve stop mechanism 11 which produces the lost motion is provided in the first hydraulic lash adjuster 10a which is a support member for the swing arm. However, a type (e.g., US Patent Application Publication No. 2008/0245326) in which the valve stop mechanism is provided in the swing-arm side may be employed. Also in such a case, the configuration according to the present invention is applicable as long as the limit speed at which the above-mentioned irregular behavior starts to occur is varied due to the attitude variation of the valve stop mechanism according to the variation of the lost-motion amount.

Although the invention has been described above with reference to certain embodiments of the invention, the invention is not limited to the embodiments described above. Modifications and variations of the embodiments described above will occur to those skilled in the art in light of the above teachings.

Some technical configurations obtainable from the above embodiments according to the present invention will now be listed with their advantageous effects.

[a] A variable valve system for an internal combustion engine, comprising: a plurality of engine valves (e.g., 3 in the drawings) provided per one cylinder; a swing arm (6) configured to perform an opening-and-closing operation of at least one of the plurality of engine valves (3) by swinging about a fulcrum given by a support member (10a); a variable lift mechanism (5, 7, 8, 9) configured to cause the swing arm (6) to swing, and to vary a lift amount of the at least one of the plurality of engine valves (3); a valve stop mechanism (11) provided for the at least one of the plurality of engine valves (3), and configured to stop the opening-and-closing operation of the at least one of the plurality of engine valves (3) by producing a lost motion of the support member (10a); and an engine-speed limiting section (53) configured to variably limit a maximum rotational speed of the internal combustion engine in accordance with a displacement amount of the lost motion produced by the valve stop mechanism (11).

[b] Alternatively, a control apparatus for an internal combustion engine, comprising: a plurality of engine valves (e.g., 3 in the drawings) provided per one cylinder; a swing arm (6) configured to perform an opening-and-closing operation of at least one of the plurality of engine valves (3) by swinging about a fulcrum given by a support member (10a); a variable lift mechanism (5, 7, 8, 9) configured to cause the swing arm (6) to swing, and to vary a lift amount of the at least one of the plurality of engine valves (3); a valve stop mechanism (11) provided for the at least one of the plurality of engine valves (3), and configured to stop the opening-and-closing operation of the at least one of the plurality of engine valves (3) by producing a lost motion of the support member (10a); and an electronic controller (53) configured to controllably limit a maximum rotational speed of the internal combustion engine in accordance with a displacement amount of the lost motion produced by the valve stop mechanism (11).

[c] Further alternatively, a variable valve apparatus for an internal combustion engine, comprising: a plurality of engine valves (e.g., 3 in the drawings) provided per one cylinder; a swing arm (6) configured to perform an opening-and-closing operation of at least one of the plurality of engine valves (3) by swinging about a fulcrum given by a support member (10a); a variable lift mechanism (5, 7, 8, 9) configured to cause the swing arm (6) to swing, and to vary a lift amount of the at least one of the plurality of engine valves (3); a valve stop mechanism (11) provided for the at least one of the plurality of engine valves (3), and configured to stop the opening-and-closing operation of the at least one of the plurality of engine valves (3) by producing a lost motion of the support member (10a); and an engine-speed limiting section (53) configured to variably limit a maximum rotational speed of the internal combustion engine in accordance with a displacement amount of the lost motion produced by the valve stop mechanism (11), wherein the engine-speed limiting section (53) includes a detecting section configured to detect a current value of the displacement amount of the lost motion and to output an information signal of the current value.

Since the maximum rotational speed of the engine is limited under the valve-stopped state in accordance with the displacement amount of the lost motion produced by the valve stop mechanism (11), the abnormal behavior (irregular behavior) such as the partial wear and the detachment of valve component(s) can be avoided.

[d] The variable valve system as described in the above item [a], wherein the engine-speed limiting section (e.g., 53 in the drawings) is configured to reduce the maximum rotational speed of the internal combustion engine with an increase of the displacement amount of the lost motion.

Accordingly, the abnormal phenomenon (irregular behavior) such as the partial wear and the detachment of the components which is caused by an improper attitude of the valve stop mechanism (11) due to the increase of the lost-motion displacement amount can be suppressed.

[e] The variable valve system as described in the above item [d], wherein the engine-speed limiting section (e.g., 53 in the drawings) is configured to set the maximum rotational speed of the internal combustion engine such that a value of the maximum rotational speed in a case that the valve stop mechanism (11) is in execution of the lost motion is lower than a value of the maximum rotational speed in a case that the valve stop mechanism (11) is not in execution of the lost motion, over an entire variable lift range of the variable lift mechanism (5, 7, 8, 9).

Accordingly, the spring load of the return spring (35) for returning the lost motion can be set as a low value. Hence, a valve-system friction of the lost motion at the time of valve stop can be reduced.

[f] The variable valve system as described in the above item [a], wherein the engine-speed limiting section (e.g., 53 in the drawings) is configured to set the maximum rotational speed of the internal combustion engine such that a value of the maximum rotational speed in a case that the valve stop mechanism (11) is in execution of the lost motion is substantially equal to a value of the maximum rotational speed in a case that the valve stop mechanism (11) is not in execution of the lost motion to allow the opening-and-closing operation of the at least one of the plurality of engine valves (3), over a predetermined range within a variable lift range of the variable lift mechanism (5, 7, 8, 9), and to set the maximum rotational speed of the internal combustion engine such that a value of the maximum rotational speed in the case that the valve stop mechanism (11) is in execution of the lost motion is lower than a value of the maximum rotational speed in the case that the valve stop mechanism (11) is not in execution of the lost motion to allow the opening-and-closing operation of the at least one of the plurality of engine valves (3), over a range except the predetermined range within the variable lift range of the variable lift mechanism (5, 7, 8, 9).

Accordingly, while avoiding a failure of the engine due to the over-revving, the maximum rotational speed of the engine can be set relatively high by the engine-speed limiting section or means (53) when the valve stop mechanism (11) is in execution of the lost motion.

[g] The variable valve system as described in the above item [a], wherein the engine-speed limiting section (e.g., 53 in the drawings) is configured to limit the maximum rotational speed of the internal combustion engine by means of a friction brake which dumps a rotative force of the internal combustion engine by friction.

[h] The variable valve system as described in the above item [a], wherein the engine-speed limiting section (e.g., 53 in the drawings) is configured to limit the maximum rotational speed of the internal combustion engine by means of a regenerative brake which applies a braking force to a rotation of the internal combustion engine such that rotational energy of the internal combustion engine is regenerated as electric energy by a power-generation function of an electric motor.

Accordingly, the battery can be charged with the electric energy obtained by the regeneration when restricting the maximum rotational speed of the engine, so that the total fuel consumption of the vehicle can be saved.

[i] The variable valve system as described in the above item [h], wherein the electric motor is an alternator motor configured to rotate in synchronization with the internal combustion engine, and the regenerative brake is generated by controlling the alternator motor.

Accordingly, the regenerated energy can be easily obtained without providing an additional motor.

[j] The variable valve system as described in the above item [a], wherein the engine-speed limiting section (e.g., 53 in the drawings) includes a control section configured to limit a fuel injection to the internal combustion engine.

[k] The variable valve system as described in the above item [a], wherein the support member (e.g., 10a in the drawings) is constituted by a hydraulic lash adjuster.

[l] The variable valve system as described in the above item [k], wherein the valve stop mechanism (e.g., 11 in the drawings) includes a retaining hole (1a) in which the support member (10a) is retained to be movable, a spring (35) biasing the support member (10a) toward the swing arm (6), and a switching section configured to switch between a fixed state where the support member (10a) is fixed to the retaining hole (1a) and an unfixed state where the support member (10a) is movable.

[m] The variable valve system as described in the above item [k], wherein the displacement amount of the lost motion is calculated from a rotation angle (e.g., in the drawings) of a control shaft (21) provided to the variable lift mechanism (5, 7, 8, 9) when the valve stop mechanism (11) is in execution of the lost motion.

Accordingly, a cost rise can be suppressed since a normally-existing rotation-angle sensor is used for sensing the lost-motion displacement amount without providing an additional sensor.

[n] The variable valve system as described in the above item [a], wherein the engine-speed limiting section (e.g., 53 in the drawings) is configured to limit the maximum rotational speed of the internal combustion engine when an accelerator opening or a rotational speed of the internal combustion engine increases under a stopped state of the opening-and-closing operation of the at least one of the plurality of engine valves (3).

Accordingly, an excessive speed-up of the engine is suppressed by the engine-speed limiting section, for example, at the time of sudden acceleration of the vehicle. Therefore, the irregular behavior such as the detachment of the swing arm can be inhibited from occurring due to the lost motion.

[o] The variable valve system as described in the above item [a], wherein the engine-speed limiting section (e.g., 53 in the drawings) includes a control map which determines the maximum rotational speed of the internal combustion engine in accordance with the displacement amount of the lost motion, and the engine-speed limiting section (53) is configured to calculate an actually permissible limit speed (Na) by the control map, and to use the actually permissible limit speed (Na) as the maximum rotational speed of the internal combustion engine when the valve stop mechanism (11) is in execution of the lost motion.

[p] The variable valve system as described in the above item [o], wherein the control map is set to reduce the actually permissible limit speed (e.g., Na in the drawings) with an increase of the displacement amount of the lost motion, wherein the engine-speed limiting section (53) is configured to set the maximum rotational speed of the internal combustion engine such that a value of the maximum rotational speed in a case that the valve stop mechanism (11) is in execution of the lost motion is substantially equal to a value of the maximum rotational speed in a case that the valve stop mechanism (11) is not in execution of the lost motion to allow the opening-and-closing operation of the at least one of the plurality of engine valves (3), when the displacement amount of the lost motion is smaller than a predetermined value, and to set the actually permissible limit speed (Na) as the maximum rotational speed of the internal combustion engine, when the displacement amount of the lost motion is larger than or equal to the predetermined value.

[q] The variable valve system as described in the above item [o], wherein the control map is set to increase the actually permissible limit speed (e.g., Na in the drawings) with an increase of the displacement amount of the lost motion, wherein the engine-speed limiting section (53) is configured to set the actually permissible limit speed (Na) as the maximum rotational speed of the internal combustion engine in a case that the valve stop mechanism (11) is in execution of the lost motion, when the displacement amount of the lost motion is smaller than a predetermined value, and to set the maximum rotational speed of the internal combustion engine such that a value of the maximum rotational speed in the case that the valve stop mechanism (11) is in execution of the lost motion is substantially equal to a value of the maximum rotational speed in a case that the valve stop mechanism (11) is not in execution of the lost motion to allow the opening-and-closing operation of the at least one of the plurality of engine valves (3), when the displacement amount of the lost motion is larger than or equal to the predetermined value.

[r] The variable valve system as described in the above item [a], wherein the engine-speed limiting section (e.g., 53 in the drawings) is configured to set the actually permissible limit speed (Na) as the maximum rotational speed of the internal combustion engine for a predetermined period ($\Delta T$) after detecting that the valve stop mechanism (11) releases a stopped state of the opening-and-closing operation of the at least one of the plurality of engine valves (3).

[s] The control apparatus as described in the above item [b], wherein the electronic controller (e.g., 53 in the drawings) includes a calculating section having an input section configured to receive the displacement amount of the lost motion and an output section configured to output the maximum rotational speed of the internal combustion engine.

[t] The variable valve apparatus as described in the above item [c], wherein the current value of the displacement amount of the lost motion is detected by an operating state of the valve stop mechanism (e.g., 11 in the drawings) and a control position of the variable lift mechanism (5, 7, 8, 9).

[u] A variable valve system for an internal combustion engine, comprising: a plurality of engine valves (e.g., 3 in the drawings); a variable lift mechanism (5, 7, 8, 9) configured to perform an opening-and-closing operation of at least one of the plurality of engine valves (3) through a support member (10a), and to vary a lift amount of the at least one of the plurality of engine valves (3); a valve stop mechanism (11) provided for the at least one of the plurality of engine valves (3), and configured to stop the opening-and-closing operation of the at least one of the plurality of engine valves (3) by producing a lost motion of the support member (10a); and an engine-speed limiting section (53) configured to variably limit a maximum rotational speed of the internal combustion engine in accordance with a displacement amount of the lost motion produced by the valve stop mechanism (11).

Accordingly, the irregular behavior such as the detachment of valve mechanism can be prevented during the stopped state of the intake valve in the same manner as the above item [a] since the maximum rotational speed of the engine is limited according to the stroke amount of the lost motion produced by the valve stop mechanism (11).

This application is based on prior Japanese Patent Application No. 2013-44864 filed on Mar. 7, 2013. The entire contents of this Japanese Patent Application are hereby incorporated by reference.

The scope of the invention is defined with reference to the following claims.

What is claimed is:

1. A variable valve apparatus for an internal combustion engine, comprising:
   a plurality of engine valves provided per one cylinder;
   a swing arm configured to perform an opening-and-closing operation of at least one of the plurality of engine valves by swinging about a fulcrum given by a support member;
   a variable lift mechanism configured
      to cause the swing arm to swing, and
      to vary a lift amount of the at least one of the plurality of engine valves;
   a valve stop mechanism provided for the at least one of the plurality of engine valves, and configured to stop the opening-and-closing operation of the at least one of the plurality of engine valves by producing a lost motion of the support member; and
   an engine-speed limiting section configured to variably limit a maximum rotational speed of the internal combustion engine in accordance with a displacement amount of the lost motion produced by the valve stop mechanism, wherein the engine-speed limiting section includes a detecting section configured to detect a current value of the displacement amount of the lost motion and to output an information signal of the current value.

2. The variable valve apparatus as claimed in claim 1, wherein
   the current value of the displacement amount of the lost motion is detected by an operating state of the valve stop mechanism and a control position of the variable lift mechanism.

3. A variable valve system, for an internal combustion engine, comprising:
   a plurality of engine valves provided per one cylinder;
   a swing arm configured to perform an opening-and-closing operation of at least one of the plurality of engine valves by swinging about a fulcrum given by a support member;
   a variable lift mechanism configured
      to cause the swing arm to swing, and
      to vary a lift amount of the at least one of the plurality of engine valves;
   a valve stop mechanism provided for the at least one of the plurality of engine valves, and configured to stop the opening-and-closing operation of the at least one of the plurality of engine valves by producing a lost motion of the support member; and
   an engine-speed limiting section configured to variably limit a maximum rotational speed of the internal combustion engine in accordance with a displacement amount of the lost motion produced by the valve stop mechanism,
   wherein the engine-speed limiting section is configured to reduce the maximum rotational speed of the internal combustion engine with an increase of the displacement amount of the lost motion.

4. The variable valve system as claimed in claim 3, wherein the engine-speed limiting section is configured to set the maximum rotational speed of the internal combustion engine such that a value of the maximum rotational speed in a case that the valve stop mechanism is in execution of the lost motion is lower than a value of the maximum rotational speed in a case that the valve stop mechanism is not in execution of the lost motion, over an entire variable lift range of the variable lift mechanism.

5. A control apparatus for an internal combustion engine, comprising:
   a plurality of engine valves provided per one cylinder;
   a swing arm configured to perform an opening-and-closing operation of at least one of the plurality of engine valves by swinging about a fulcrum given by a support member,
   a variable lift mechanism configured
      to cause the swing arm to swing, and
      to vary a lift amount of the at least one of the plurality of engine valves;
   a valve stop mechanism provided for the at least one of the plurality of engine valves, and configured to stop the opening-and-closing operation of the at least one of the plurality of engine valves by producing a lost motion of the support member; and an electronic controller configured to controllably limit a maximum rotational speed of the internal combustion engine in in accordance with a displacement amount of the lost motion produced by the valve stop mechanism, wherein the electronic controller includes a calculating section having an input section configured to receive the displacement amount of the lost motion and an output section configured to output the maximum rotational speed of the internal combustion engine.

\* \* \* \* \*